United States Patent
Wang et al.

(10) Patent No.: US 10,053,568 B2
(45) Date of Patent: *Aug. 21, 2018

(54) HETEROPHASIC PROPYLENE COPOLYMER WITH HIGH MELTING POINT

(71) Applicant: Borealis AG, Vienna (AT)

(72) Inventors: Jingbo Wang, Linz (AT); Petar Doshev, Linz (AT); Markus Gahleitner, Neuhofen/Krems (AT); Johanna Lilja, Porvoo (FI)

(73) Assignee: BOREALIS AG (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/123,313

(22) PCT Filed: Feb. 3, 2015

(86) PCT No.: PCT/EP2015/052198
§ 371 (c)(1),
(2) Date: Sep. 2, 2016

(87) PCT Pub. No.: WO2015/139875
PCT Pub. Date: Sep. 24, 2015

(65) Prior Publication Data
US 2017/0066912 A1    Mar. 9, 2017

(30) Foreign Application Priority Data

Mar. 21, 2014  (EP) .................................... 14161005

(51) Int. Cl.
*C08L 23/16* (2006.01)
*C08F 10/06* (2006.01)

(52) U.S. Cl.
CPC .............. *C08L 23/16* (2013.01); *C08F 10/06* (2013.01); *C08L 2205/025* (2013.01); *C08L 2314/06* (2013.01)

(58) Field of Classification Search
CPC .............. C08L 23/16; C08L 2205/025; C08L 2314/06; C08F 10/06; C08F 210/16; C08F 2/0001; C08F 2500/05; C08F 2500/12; C08F 2500/17; C08F 2500/26
See application file for complete search history.

(56) References Cited

U.S. PATENT DOCUMENTS

| | | | |
|---|---|---|---|
| 8,680,207 B2 * | 3/2014 | Klimke et al. .......... | C08L 23/10 525/191 |
| 2014/0303308 A1 * | 10/2014 | Grestenberger et al. ....... | C08L 23/10 524/528 |
| 2016/0347944 A1 * | 12/2016 | Wang et al. ............. | C08J 5/18 |

FOREIGN PATENT DOCUMENTS

| | | |
|---|---|---|
| EP | 0887379 A1 | 12/1998 |
| EP | 2557118 A1 | 2/2013 |
| RU | 2446181 C1 | 3/2012 |
| WO | 9212182 A1 | 7/1992 |
| WO | 9924478 A1 | 5/1999 |
| WO | 9924479 A1 | 5/1999 |
| WO | 0068315 A1 | 11/2000 |
| WO | 2004000899 A1 | 12/2003 |
| WO | 2004111095 A1 | 12/2004 |
| WO | 2005023891 A1 | 3/2005 |
| WO | 2005052264 A1 | 5/2010 |
| WO | 2010052260 A1 | 5/2010 |
| WO | 2010052263 A1 | 5/2010 |
| WO | 2012016965 A1 | 2/2012 |
| WO | 2012028252 A1 | 3/2012 |
| WO | 2012159927 A1 | 11/2012 |
| WO | 2013007650 A1 | 1/2013 |
| WO | 2015/044730 A1 | 4/2015 |
| WO | 2015/117948 A1 | 8/2015 |
| WO | 2015/150467 A1 | 10/2015 |

OTHER PUBLICATIONS

Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.
Wang, Wen-Jun, et al., "Structural Analysis of Ethylene/Propylene Copolymers Synthesized With a Constrained Geometry Catalyst", Macromolecules 2000, 33, 1157-1162.
Singh, Gurmeet, et al., "Triad Sequence Determination of Ethylene-Propylene Copolymers—Application of Quantitative 13C NMR", Polymer Testing 28 (2009) 475-479.
Kakugo, Masahiro, et al., "13C NMR Determination of Monomer Sequence Distribution in Ethylene-Propylene Copolymers Prepared with Sigma-TiCl3-Al( C2H5)2 Cl" Macromolecules 1982, 15, 1150-1152.
Cheng, H.N., "13C NMR Analysis of Ethylene-Propylene Rubbers", Macromolecules 1984, 17, 1950-1955.
Pasquini, Neil, Polypropylene Handbook, 2nd Edition, 2005, p. 445.
Busico, Vincenzo, et al., "ALK-1-ENE Polymerization in the Presence of a Monocyclopentadienyl Zirconium(IV) Acetamidinate Catalyst: Microstructural and Mechanistic Insights", Macromol. Rapid Commun. 2007, 28, 1128-1134.
Resconi, Luigi, et al., "Selectivity in Propene Polymerization With Metallocene Catalysts", Chem. Rev. 2000, 100, 1253-1345.
Office Action for Japanese Application No. 2016-555489, dated Apr. 12, 2017.
Russian Office Action for Application No. 2016139260/04(062603), dated Oct. 27, 2017.

* cited by examiner

*Primary Examiner* — Nathan M Nutter
(74) *Attorney, Agent, or Firm* — Tarolli, Sundheim, Covell & Tummino LLP

(57) ABSTRACT

Heterophasic propylene copolymer for retortability, said copolymer has a comonomer content in the range of 1.5 to 14.0 mol-%; a melting temperature in the range of 140 to 15° C. and a xylene cold soluble (XCS) fraction in the range of 10.0 to below 30.0 wt.-%.

24 Claims, No Drawings

HETEROPHASIC PROPYLENE COPOLYMER WITH HIGH MELTING POINT

The present invention is directed to a new heterophasic propylene copolymer with high melting point, to its preparation as well as to articles made therefrom.

There is an increasing trend in the food packaging industry to use plastic containers, notably pouches containing sterilised or pre-cooked foods. Retort pouches offer many advantages over rigid metal packages such as faster cooking/sterilizing time, less shelf storage space, easier disposal, improved food taste, etc. Typical pouches have a multilayer structure with polyolefins such as polyethylene or polypropylene, adhesives, barrier and external layers. It is desired that the polyolefin material imparts stiffness as well as high impact strength to the final packaging material.

The same trend, i.e. increased use of polyolefinic materials, is seen in the medical packaging industry as well. Again, the polymer should impart sufficient stiffness as well as high impact strength to the final packaging material. In the case of medical applications, softness rather than stiffness is a key-requirement. Of course also these medical products must be sterilisable.

It is known that impact strength of polypropylene can be improved by dispersing a rubber phase within the polymer matrix, thereby obtaining a heterophasic polypropylene composition. In particular, heterophasic propylene polymers (impact-modified propylene polymers) provide high impact strength if the amount of rubber dispersed within the matrix is sufficiently high, e.g. in stand-up pouches typically at least 10.0 wt.-% or even at least 15.0 wt.-%.

However, in the field of food and medical packaging soft materials with good optical properties in combination with good mechanical properties are required.

Further, for some food packaging applications such as retort pouches or some medical packaging applications, a sterilisation treatment is needed. The most common sterilization procedures are the use of heat (steam), radiation (beta radiation, electrons, or gamma radiation) or chemicals (usually ethylene oxide). Steam sterilisation is usually carried out in a temperature range of about 120 to 130° C. Of course, treatment of a polymer under the sterilisation conditions outlined above can impair its final properties, especially the optical properties such as transparency.

However, it has turned out that standard heterophasic systems change significantly their properties after steam sterilisation. Typically, the optical properties such as haze as well as the mechanical properties such as softness are undesirable impaired.

Another important aspect is the sealing ignition temperature (SIT). Typically rather low values are desired from an economic point of view. Normally a low SIT is linked with a rather low melting temperature, which is however detrimental in view of the discussion above.

Considering the drawbacks outlined above, it is an object of the present invention to provide a soft heterophasic propylene copolymer with an optimized or improved balance between mechanical and optical properties especially after steam sterilisation. Further the sealing ignition temperature (SIT) should be rather low but without compromising the melting temperature.

The finding of the present invention is to provide a heterophasic propylene copolymer with balanced comonomer content in the rubber and matrix phase. Preferably the matrix phase is bimodal in view of the comonomer content.

Accordingly the present invention is directed in a first embodiment to a heterophasic propylene copolymer (RAHECO) comprising (i) a matrix (M) being a propylene copolymer (R-PP) and
(ii) an elastomeric propylene copolymer (EC) dispersed in said matrix (M), said heterophasic propylene copolymer (RAHECO) has (a) a comonomer content in the range of 1.5 to 14.0 mol-%;
(b) preferably a melting temperature determined by differential scanning calorimetry (DSC) in the range of 140 to 155° C.;
(c) a xylene cold soluble (XCS) fraction determined according to ISO 16152 (25° C.) in the range of 10.0 to equal or below 30.0 wt.-%, wherein further the propylene copolymer (RAHECO) fulfills
(d) the in-equation (I)

$$\frac{C(XCS)}{C(\text{total})} > 2.1 \qquad (I)$$

wherein

C(XCS) is the comonomer content [in mol-%] of the xylene cold soluble (XCS) fraction of the total heterophasic propylene copolymer (RAHECO);

C(total) is the comonomer content [in mol-%] of the total heterophasic propylene copolymer (RAHECO);

and/or, preferably and, (e) the in-equation (II)

$$Tm \geq 152.0 - 1.8 C(XCI) \qquad (II)$$

Tm is melting temperature [in ° C.] of the total heterophasic propylene copolymer (RAHECO);

C(XCI) is the comonomer content [in mol-%] of the xylene cold insoluble (XCI) fraction of the heterophasic propylene copolymer (RAHECO).

Preferably, in the first embodiment the heterophasic propylene copolymer (RAHECO) is comprising (i) a matrix (M) being a propylene copolymer (R-PP) and
(ii) an elastomeric propylene copolymer (EC) dispersed in said matrix (M), said heterophasic propylene copolymer (RAHECO) has (a) a comonomer content in the range of 1.5 to 14.0 mol-%;
(b) preferably a melting temperature determined by differential scanning calorimetry (DSC) in the range of 140 to 155° C.;
(c) a xylene cold soluble (XCS) fraction determined according to ISO 16152 (25° C.) in the range of 10.0 to equal or below 30.0 wt.-%, wherein further the propylene copolymer (RAHECO) fulfills (d) the in-equation (I)

$$\frac{C(XCS)}{C(\text{total})} > 2.1 \qquad (I)$$

wherein

C(XCS) is the comonomer content [in mol-%] of the xylene cold soluble (XCS) fraction of the total heterophasic propylene copolymer (RAHECO);

C(total) is the comonomer content [in mol-%] of the total heterophasic propylene copolymer (RAHECO);

and/or, preferably and, (e) the in-equation (II)

$$Tm \geq 153.5 - 1.8 C(XCI) \qquad (II)$$

Tm is melting temperature [in ° C.] of the total heterophasic propylene copolymer (RAHECO);

C(XCI) is the comonomer content [in mol-%] of the xylene cold insoluble (XCI) fraction of the heterophasic propylene copolymer (RAHECO).

In a second embodiment the invention is directed to a heterophasic propylene copolymer (RAHECO) comprising (i) a matrix (M) being a propylene copolymer (R-PP) and (ii) an elastomeric propylene copolymer (EC) dispersed in said matrix (M), said heterophasic propylene copolymer (RAHECO) has (a) a comonomer content in the range of 1.5 to 14.0 mol-%;

(b) preferably a melting temperature determined by differential scanning calorimetry (DSC) in the range of 140 to 155° C.; and (c) a xylene cold soluble (XCS) fraction determined according to ISO 16152 (25° C.) in the range of 10.0 to equal or below 30.0 wt.-%, wherein said propylene copolymer (R-PP) comprises a first polypropylene fraction (PP1) and a second propylene copolymer fraction (R-PP2), the comonomer content in the first polypropylene fraction (PP1) is at most 2.5 mol.-%.

Preferably the comonomer content [in mol-%] in the propylene copolymer (R-PP) of the heterophasic propylene copolymer (RAHECO) according to the second embodiment is higher than in the first polypropylene fraction (PP1).

According to the second embodiment it is especially preferred that the weight ratio between the first polypropylene fraction (PP1) and the second propylene copolymer fraction (R-PP2) [(PP1)/(R-PP2)] is in the range of 30:70 to 60:40.

In one specific aspect of the second embodiment the comonomer content between the first polypropylene fraction (PP1) and the propylene copolymer (R-PP) (i.e. the matrix (M)) differ by at least 1.5 mol-% and/or the comonomer content between the first polypropylene fraction (PP1) and the second propylene copolymer fraction (R-PP2) differ by at least 3.0 mol-%.

Still more preferably the first polypropylene fraction (PP1) of the heterophasic propylene copolymer (RAHECO) according to second embodiment is a propylene homopolymer and/or the second propylene copolymer fraction (R-PP2) of the heterophasic propylene copolymer (RAHECO) according to second embodiment has a comonomer content in the range of 4.0 to 18.0 mol-%.

Still further, the heterophasic propylene copolymer (RAHECO) according to the second embodiment preferably fulfills (a) the in-equation (I)

$$\frac{C(XCS)}{C(\text{total})} > 2.1 \qquad (I)$$

wherein

C(XCS) is the comonomer content [in mol-%] of the xylene cold soluble (XCS) fraction of the total heterophasic propylene copolymer (RAHECO);

C(total) is the comonomer content [in mol-%] of the total heterophasic propylene copolymer (RAHECO);

and/or (b) the in-equation (II)

$$Tm \geq 152.0 - 1.8 C(XCI) \qquad (II)$$

Tm is melting temperature [in ° C.] of the total heterophasic propylene copolymer (RAHECO);

C(XCI) is the comonomer content [in mol-%] of the xylene cold insoluble (XCI) fraction of the heterophasic propylene copolymer (RAHECO).

In one preferred aspect of the first and second embodiment the propylene copolymer (R-PP) of the heterophasic propylene copolymer (RAHECO) has a comonomer content in the range of 1.5 to 14.0 mol-% and/or the elastomeric propylene copolymer (EC) of the heterophasic propylene copolymer (RAHECO) has a comonomer content in the range of 18.0 to 60.0 mol-%. Preferably the comonomer in the propylene copolymer (R-PP) and/or the elastomeric propylene copolymer (EC) is ethylene. In one preferred aspect the ethylene is the only comonomer in the heterophasic propylene copolymer (RAHECO).

Preferably the xylene cold soluble fraction (XCS) of the heterophasic propylene copolymer (RAHECO) according to the first and second embodiment has a comonomer content, e.g. ethylene content, in the range of 18.0 to 60.0 mol %. Additionally or alternatively the xylene cold in-soluble (XCI) fraction of the heterophasic propylene copolymer (RAHECO) according to the first and second embodiment has a comonomer content, e.g. ethylene content, in is in the range of 1.5 to 14.0 mol %.

In one specific aspect of the first and second embodiment of the present invention the intrinsic viscosity of the xylene cold soluble fraction (XCS) of the heterophasic propylene copolymer (RAHECO) is in the range of 1.1 to 2.2 dl/g.

In yet another preferred aspect of the present invention heterophasic propylene copolymer (RAHECO) according to the first or second embodiment fulfills (a) in-equation (III)

$$\frac{C(XCS)}{C(XCI)} > 5.0 \qquad (III)$$

wherein

C(XCS) is the comonomer content [in mol-%] of the xylene cold soluble (XCS) fraction of the heterophasic propylene copolymer (RAHECO);

C(XCI) is the comonomer content [in mol-%] of the xylene cold insoluble (XCI) fraction of the heterophasic propylene copolymer (RAHECO);

and/or (b) in-equation (IV)

$$\frac{C(\text{total})}{XCS} > 0.38 \qquad (IV)$$

wherein

C(XCS) is the comonomer content [in mol-%] of the heterophasic propylene copolymer (RAHECO);

XCS is the content [in wt.-%] of the xylene cold soluble (XCS) fraction of the heterophasic propylene copolymer (RAHECO);

and/or (c) In equation (V)

$$\frac{C(XCS)}{XCS} > 1.1 \qquad (V)$$

wherein

C(XCS) is the comonomer content [in mol-%] of the xylene cold soluble (XCS) fraction of the heterophasic propylene copolymer (RAHECO);

XCS is the content [in wt.-%] of the xylene cold soluble (XCS) fraction of the heterophasic propylene copolymer (RAHECO).

In still another aspect of the present invention the heterophasic propylene copolymer (RAHECO) according to the first and second embodiment has a first glass transition temperature Tg(1) and a second glass transition temperature Tg(2), wherein said first glass transition temperature Tg(1) is above the second glass transition temperature Tg(2), preferably the difference between the first glass transition temperature Tg(1) and second glass transition temperature Tg(2) is at least 40° C. Accordingly it is especially preferred that the heterophasic propylene copolymer (RAHECO) has a first glass transition temperature Tg(1) in the range of −12 to +2° C. and/or a second glass transition temperature Tg(2) in the range of −60 to −30° C. In one specific embodiment the second glass transition temperature Tg(2) fulfills the in-equation (VI)

$$Tg(2) < 11.8 - 1.65 \times C(XCS) \qquad (VI)$$

wherein

Tg(2) is the second glass transition temperature of the heterophasic propylene copolymer (RAHECO);

C(XCS) is the comonomer content [in mol-%] of the xylene cold soluble fraction (XCS) of the heterophasic propylene copolymer (RAHECO).

In another preferred aspect of the present invention the heterophasic propylene copolymer (RAHECO) according to the first and second embodiment has a flexural modulus measured according to ISO 178 of at most 550 MPa and/or a hexane extractable content determined according to FDA method on cast films of 100 μm of below 2.4 wt.-%.

Further the present invention is directed to a process for the preparation of a heterophasic propylene copolymer (RAHECO) as defined herein, said process comprises polymerizing:

(I) propylene and an α-olefin different to propylene, preferably ethylene, so as to form the matrix (M) being the propylene copolymer (PP); and subsequently polymerizing (II) propylene and an α-olefin different to propylene, preferably ethylene, preferably in the gas phase, so as to form the elastomeric propylene copolymer (EC) dispersed in said matrix (M);

wherein both steps (I) and (II) take place in the presence of the same single site solid particulate catalyst free from an external carrier, preferably a catalyst comprising (i) a complex of formula (I):

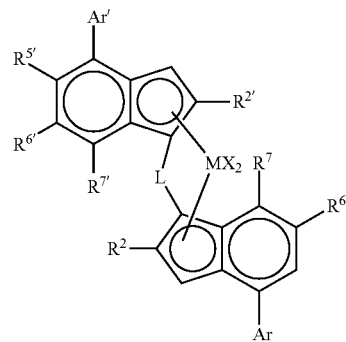

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;

$R^2$ and $R^{2'}$ are each independently a $C_1$-$C_{20}$ hydrocarbyl radical optionally containing one or more heteroatoms from groups 14-16;

$R^{5'}$ is a $C_{1-20}$ hydrocarbyl group containing one or more heteroatoms from groups 14-16 optionally substituted by one or more halo atoms;

$R^6$ and $R^{6'}$ are each independently hydrogen or a $C_{1-20}$ hydrocarbyl group optionally containing one or more heteroatoms from groups 14-16;

$R^7$ and $R^{7'}$ are each independently hydrogen or $C_{1-20}$ hydrocarbyl group optionally containing one or more heteroatoms from groups 14-16;

Ar is independently an aryl or heteroaryl group having up to 20 carbon atoms optionally substituted by one or more groups $R^1$;

Ar' is independently an aryl or heteroaryl group having up to 20 carbon atoms optionally substituted by one or more groups $R^1$;

each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;

each $R^4$ is a $C_{1-20}$ hydrocarbyl group;

and (ii) a cocatalyst comprising a compound of a group 13 metal, e.g. Al or boron compound.

Preferably step (I) comprises polymerizing propylene and optionally an α-olefin different to propylene, preferably ethylene, so as to form the first polypropylene fraction (PP1) and subsequently polymerizing in another reactor propylene and an α-olefin different to propylene, preferably ethylene, so as to form the second propylene copolymer fraction (R-PP2), the first polypropylene fraction (PP1) and the second propylene copolymer fraction (R-PP2) form the propylene copolymer (R-PP).

Finally the invention is directed to an article comprising the heterophasic propylene copolymer (RAHECO) as defined herein preferably the article is selected from the group consisting of (medical) pouches, food packaging systems, films and bottles.

In the following the first and second embodiment will be described in more detail together.

The present invention is directed to a heterophasic propylene copolymer (RAHECO). More precisely the present invention is directed to an heterophasic propylene copolymer (RAHECO) comprising a matrix (M) being a propylene copolymer (R-PP) and dispersed therein an elastomeric propylene copolymer (EC). Thus the matrix (M) contains (finely) dispersed inclusions being not part of the matrix (M) and said inclusions contain the elastomeric propylene copolymer (EC). The term "inclusion" according to this invention shall preferably indicate that the matrix and the inclusion form different phases within the heterophasic propylene copolymer (RAHECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably, the heterophasic propylene copolymer (RAHECO) according to this invention comprises as polymer components only the propylene copolymer (R-PP) and the elastomeric propylene copolymer (EC). In other words, the heterophasic propylene copolymer (RAHECO) may contain further additives but no other polymer in an amount exceeding 5.0 wt.-%, more preferably exceeding 3.0 wt.-%, like exceeding 1.0 wt.-%, based on the total heterophasic propylene copolymer (RAHECO). One additional polymer which may be present in such low amounts is a polyethylene which is a by-reaction product obtained by the preparation of the heterophasic propylene copolymer (RAHECO). Accordingly, it is in particular appreciated that the instant heterophasic propylene copolymer (RAHECO) contains only the propylene copolymer (R-PP), the elastomeric propylene copolymer (EC) and optionally polyethylene in amounts as mentioned in this paragraph.

The heterophasic propylene copolymer (RAHECO) according to this invention is featured by a moderate melt flow rate. Accordingly, the heterophasic propylene copolymer (RAHECO) has a melt flow rate $MFR_2$ (230° C.) in the range of 1.0 to 10.0 g/10 min, preferably in the range of 1.5 to 8.0 g/10 min, more preferably in the range of 2.0 to 7.0 g/10 min.

Preferably, it is desired that the heterophasic propylene copolymer (RAHECO) is thermo mechanically stable. Accordingly, it is preferred that the heterophasic propylene copolymer (RAHECO) has a melting temperature of at least 140° C., more preferably in the range of 140 to 155° C., still more preferably in the range of 143 to 150° C.

In one preferred embodiment the heterophasic propylene copolymer (RAHECO) according to the invention preferably fulfills in-equation (II), more preferably in-equation (IIa), still more preferably in-equation (IIb);

$$Tm \geq 152.0 - 1.8 C(XCI) \quad \text{(II)}$$

$$Tm \geq 153.0 - 1.8 C(XCI) \quad \text{(IIa)}$$

$$Tm \geq 153.5 - 1.8 C(XCI) \quad \text{(IIb)}$$

Tm is melting temperature [in ° C.] of the heterophasic propylene copolymer (RAHECO);

C(XCI) is the comonomer content [in mol-%] of the xylene cold insoluble (XCI) fraction of the heterophasic propylene copolymer (RAHECO).

In a preferred aspect the heterophasic propylene copolymer (RAHECO) of this invention has a rather high melting temperature but a low sealing ignition temperature (SIT). Thus it is especially preferred that the heterophasic propylene copolymer (RAHECO) according to the invention preferably fulfills in-equation (VII), more preferably in-equation (VIIa), still more preferably in-equation (VIIb);

$$Tm - SIT > 27 \quad \text{(VII)}$$

$$45 \geq Tm - SIT > 27 \quad \text{(VIIa)}$$

$$40 \geq Tm - SIT > 30 \quad \text{(VIIb)}$$

Tm is melting temperature [in ° C.] of the heterophasic propylene copolymer (RAHECO);

SIT is the sealing ignition temperature (SIT) [in ° C.] of the heterophasic propylene copolymer (RAHECO) measured as defined in the example section.

Preferably the heterophasic propylene copolymer (RAHECO) has a sealing ignition temperature (SIT) measured as defined in the example section of below 116° C., more preferably in the range of 105 to below 116° C., yet more preferably in the range of 108 to 114° C.

In another preferred aspect the heterophasic propylene copolymer (RAHECO) of this invention has a) a flexural modulus measured according to ISO 178 of at most 550 MPa, more preferably in the range of 350 to 550 MPa, yet more preferably in the range of 400 to 500 MPa;

and/or b) hexane soluble content of below 2.5 wt.-%, more preferably in the range of above 0.8 to below 2.5 wt.-%, still more preferably in the range of 1.0 to 2.0 wt.-%.

The heterophasic propylene copolymer (RAHECO) comprises apart from propylene also comonomers. Preferably the heterophasic propylene copolymer (RAHECO) comprises apart from propylene ethylene and/or $C_4$ to $C_8$ α-olefins. Accordingly the term "propylene copolymer" according to this invention is understood as a polypropylene comprising, preferably consisting of, units derivable from (a) propylene and (b) ethylene and/or $C_4$ to $C_8$ α-olefins.

Thus, the heterophasic propylene copolymer (RAHECO) as well as its individual polymer components, i.e. the propylene copolymer (R-PP), e.g. the first propylene copolymer fraction (R-PP1) and the second propylene copolymer fraction (R-PP2), as well as the elastomeric propylene copolymer (EC), comprises monomers copolymerizable with propylene, for example comonomers such as ethylene and/or $C_4$ to $C_8$ α-olefins, in particular ethylene and/or $C_4$ to $C_8$ α-olefins, e.g. 1-butene and/or 1-hexene. Preferably, the heterophasic propylene copolymer (RAHECO) according to this invention comprises, especially consists of, monomers copolymerizable with propylene from the group consisting of ethylene, 1-butene and 1-hexene. More specifically, the heterophasic propylene copolymer (RAHECO) of this invention comprises—apart from propylene—units derivable from ethylene and/or 1-butene. In a preferred embodiment, the heterophasic propylene copolymer (RAHECO) according to this invention comprises units derivable from ethylene and propylene only. Still more preferably the propylene copolymer (R-PP), i.e. the first propylene copolymer fraction (R-PP1) and the second propylene copolymer fraction (R-PP2), as well as the elastomeric propylene copolymer (EC) of the heterophasic propylene copolymer (RAHECO) contain the same comonomers, like ethylene.

Accordingly, the elastomeric propylene copolymer (EC) is preferably an ethylene propylene rubber (EPR), whereas the propylene copolymer (R-PP) is a propylene ethylene copolymer (R-PP), i.e. consist only units derived from propylene and ethylene. Accordingly in one specific embodiment the comonomer in the heterophasic propylene copolymer (RAHECO) is ethylene.

Additionally, it is appreciated that the heterophasic propylene copolymer (RAHECO) preferably has a specific total comonomer content which contributes to the softness of the material. Thus, it is required that the comonomer content of the heterophasic propylene copolymer (RAHECO) is in the range from 1.5 to 14.0 mol-%, preferably in the range from 5.0 to 13.5 mol-%, more preferably in the range from 7.0 to 13.0 mol-%, yet more preferably in the range from 8.0 to 13.0 mol-%, like in the range of 8.5 to 12.0 mol-%

The xylene cold soluble (XCS) fraction measured according to ISO 16152 (25° C.) of the heterophasic propylene copolymer (RAHECO) is in the range from 10.0 to equal or below 30.0 wt.-%, preferably in the range from 12.0 to 28.0 wt.-%, more preferably in the range from 15.0 to 25.0 wt.-%, still more preferably in the range from 16.0 to 23.0 wt.-%.

The remaining part is the xylene cold in-soluble (XCI) fraction of the heterophasic propylene copolymer (RAHECO). Accordingly the xylene cold in-soluble (XCI) fraction of the heterophasic propylene copolymer (RAHECO) is in the range from equal or below 70.0 to 90.0 wt.-%, preferably in the range from 72.0 to 88.0 wt.-%, more preferably in the range from 75.0 to 85.0 wt.-%, still more preferably in the range from 77.0 to 84.0 wt.-%.

Further it is appreciated that the xylene cold soluble (XCS) fraction of the heterophasic propylene copolymer (RAHECO) is specified by its intrinsic viscosity. A low intrinsic viscosity (IV) value reflects a low weight average molecular weight. For the present invention it is preferred that the xylene cold soluble fraction (XCS) of the heterophasic propylene copolymer (RAHECO) has an intrinsic viscosity (IV) measured according to ISO 1628/1 (at 135° C. in decalin) of equal or below 2.2 dl/g, more preferably in the range of 1.1 to equal or below 2.2 dl/g, still more preferably in the range of 1.1 to 2.1 dl/g, yet more preferably in the range of 1.1 to 2.0 dl/g.

Additionally it is preferred that the comonomer content, i.e. ethylene content, of the xylene cold soluble (XCS) fraction of the heterophasic propylene copolymer (RAHECO) is not more than 60.0 mol-%, more preferably in the range of 18.0 to 60.0 mol-%, still more preferably in the range of 25.0 to 50.0 mol-%, yet more preferably in the range of 27.0 to 40.0 mol-%. The comonomers present in the xylene cold soluble (XCS) fraction are those defined below for the elastomeric propylene copolymer (EC). In one preferred embodiment the comonomer is ethylene only.

Still further, the heterophasic propylene copolymer (RAHECO) according to the invention preferably fulfills in-equation (I), more preferably in-equation (Ia), still more preferably in-equation (Ib), yet more preferably in-equation (Ic);

$$\frac{C(XCS)}{C(\text{total})} > 2.1; \tag{I}$$

$$20.0 \geq \frac{C(XCS)}{C(\text{total})} > 2.4; \tag{Ia}$$

$$10.0 \geq \frac{C(XCS)}{C(\text{total})} \geq 2.5; \tag{Ib}$$

$$5.3 \geq \frac{C(XCS)}{C(\text{total})} \geq 2.7; \tag{Ic}$$

wherein

C(XCS) is the comonomer content [in mol-%] of the xylene cold soluble (XCS) fraction of the heterophasic propylene copolymer (RAHECO);

C(total) is the comonomer content [in mol-%] of the total heterophasic propylene copolymer (RAHECO).

Additionally or alternatively to in-equation (I) it is preferred that the heterophasic propylene copolymer (RAHECO) according to the invention preferably fulfills in-equation (IV), more preferably in-equation (IVa), still more preferably in-equation (IVb), yet more preferably in-equation (IVc), $$\frac{C(\text{total})}{XCS} > 0.38; \tag{IV}$$

$$1.40 \geq \frac{C(\text{total})}{XCS} > 0.38; \tag{IVa}$$

$$1.00 \geq \frac{C(\text{total})}{XCS} > 0.45; \tag{IVb}$$

$$0.80 \geq \frac{C(\text{total})}{XCS} > 0.50; \tag{IVc}$$

wherein

C(XCS) is the comonomer content [in mol-%] of the total heterophasic propylene copolymer (RAHECO);

XCS is the content [in wt.-%] of the xylene cold soluble (XCS) fraction of the heterophasic propylene copolymer (RAHECO).

Additionally or alternatively to in-equation (I) and/or in-equation (IV), it is preferred that the heterophasic propylene copolymer (RAHECO) according to the invention preferably fulfills in-equation (V), more preferably in-equation (Va), still more preferably in-equation (Vb), $$\frac{C(XCS)}{XCS} > 1.1 \tag{V}$$

$$6.0 \geq \frac{C(XCS)}{XCS} > 1.1 \tag{Va}$$

$$3.0 \geq \frac{C(XCS)}{XCS} > 1.2 \tag{Vb}$$

wherein

C(XCS) is the comonomer content [in mol-%] of the xylene cold soluble (XCS) fraction of the heterophasic propylene copolymer (RAHECO);

XCS is the content [in wt.-%] of the xylene cold soluble (XCS) fraction of the heterophasic propylene copolymer (RAHECO).

With regard to the xylene cold in-soluble (XCI) fraction of the heterophasic propylene copolymer (RAHECO) it is preferred that the comonomer content, i.e. ethylene content, of said fraction is in the range from 1.5 to 14.0 mol-%, more preferably in the range from 1.5 to 10.0 mol-%, yet more preferably in the range from 3.0 to 8.5 mol-%, still more preferably in the range from 3.5 to 8.0 mol-%, like in the range of 4.0 to 7.5 mol-%. The comonomers present in the xylene cold in-soluble (XCI) fraction are those defined below for the propylene copolymer (R-PP). In one preferred embodiment the comonomer is ethylene only.

The xylene cold in-soluble (XCI) fraction of the heterophasic propylene copolymer (RAHECO) is mainly influenced by the matrix (M), i.e. by the propylene copolymer (R-PP). Accordingly it is preferred that the xylene cold in-soluble (XCI) fraction of the heterophasic propylene copolymer (RAHECO) has a melt flow rate MFR$_2$ (230° C.) in the range of 1.0 to 10.0 g/10 min, preferably in the range of 1.5 to 8.0 g/10 min, more preferably in the range of 2.0 to 7.0 g/10 min.

Preferably the molecular weight distribution (MWD) of the xylene cold in-soluble (XCI) fraction of the heterophasic propylene copolymer (RAHECO) is in the range of 3.0 to 6.0, more preferably in the range of 3.5 to 5.7, like in the range of 3.7 to 5.5.

In a preferred embodiment the heterophasic propylene copolymer (RAHECO) according to the invention preferably fulfills in-equation (III), more preferably in-equation (IIIa), still more preferably in-equation (IIIb), yet more preferably in-equation (IIIc);

$$\frac{C(XCS)}{C(XCI)} > 5.0 \tag{III}$$

$$20.0 \geq \frac{C(XCS)}{C(XCI)} > 5.0 \tag{IIIa}$$

$$15.0 \geq \frac{C(XCS)}{C(XCI)} > 5.2 \tag{IIIb}$$

$$10.0 \geq \frac{C(XCS)}{C(XCI)} > 5.5 \tag{IIIc}$$

wherein

C(XCS) is the comonomer content [in mol-%] of the xylene cold soluble (XCS) fraction of the heterophasic propylene copolymer (RAHECO);

C(XCI) is the comonomer content [in mol-%] of the xylene cold in-soluble (XCI) fraction of the heterophasic propylene copolymer (RAHECO).

As mentioned above multiphase structure of the heterophasic propylene copolymer (RAHECO) (elastomeric propylene copolymer (EC) dispersed in the matrix (M)) can be identified by the presence of at least two distinct glass transition temperatures. The higher first glass transition temperature (Tg(1)) represents the matrix (M), i.e. the propylene copolymer (R-PP), whereas the lower second glass transition temperature (Tg(2)) reflects the elastomeric propylene copolymer (EC) of the heterophasic propylene copolymer (RAHECO).

Accordingly, it is one preferred requirement of the present invention, that the heterophasic propylene copolymer (RAHECO) has a second glass transition temperature Tg(2) fulfilling the in-equation (VI), more preferably the in-equation (VIa), still more preferably in-equation (VIb), $$Tg(2) < 11.8 - 1.65 \times C(XCS) \tag{VI}$$

$$11.8 - 2.10 \times C(XCS) < Tg(2) < 11.8 - 1.70 \times C(XCS) \tag{VIa}$$

$$11.8 - 1.95 \times C(XCS) < Tg(2) < 11.8 - 1.75 \times C(XCS) \tag{VIb}$$

wherein

Tg(2) is the second glass transition temperature of the heterophasic propylene copolymer (RAHECO);

C(XCS) is the comonomer content [in mol-%] of the xylene cold soluble fraction (XCS) of the heterophasic propylene copolymer (RAHECO).

Preferably the second glass transition temperature Tg(2) is below −25° C., like equal or below −35° C., more preferably is in the range of −60 to −30° C., still more preferably in the range of −58 to −35° C. It is especially preferred that the heterophasic propylene copolymer (RAHECO) has a second glass transition temperature Tg(2) as mentioned in this paragraph and fulfilling the in-equation (I) as defined in the present invention.

It is further appreciated that the heterophasic propylene copolymer (RAHECO) according to this invention has additionally a first glass transition temperature Tg(1) (representing the matrix (M) of the heterophasic propylene copolymer (RAHECO)) in the range of −12 to +2° C., more preferably in the range of −10 to +2° C., like in the range −8 to 0° C.

Accordingly the first glass transition temperature Tg(1) is preferably above the second glass transition temperature Tg(2). Still more preferably the difference between the first glass transition temperature Tg(1) and second glass transition temperature Tg(2) is at least 38° C., more preferably at least 40° C., yet more preferably in the range of 38 to 50° C., still more preferably in the range of 40 to 48° C.

The heterophasic propylene copolymer (RAHECO) as defined in the instant invention may contain up to 5.0 wt.-% additives, like nucleating agents and antioxidants, as well as slip agents and antiblocking agents. Preferably the additive content is below 3.0 wt.-%, like below 1.0 wt.-%.

The heterophasic propylene copolymer (RAHECO) can be further defined by its individual components, i.e. the propylene copolymer (R-PP) and the elastomeric propylene copolymer (EC).

The propylene copolymer (R-PP) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the propylene copolymer (R-PP) according to this invention comprises, especially consists of, monomers copolymerizable with propylene from the group consisting of ethylene, 1-butene and 1-hexene. More specifically the propylene copolymer (R-PP) of this invention comprises—apart from propylene—units derivable from ethylene and/or 1-butene. In a preferred embodiment the propylene copolymer (R-PP) comprises units derivable from ethylene and propylene only.

As mentioned above the heterophasic propylene copolymer (RAHECO) is featured by moderate comonomer content. Accordingly, the comonomer content of the propylene copolymer (R-PP) is in the range of 1.5 to 14.0 mol-%, yet more preferably in the range of 2.5 to 10.0 mol-%, still more preferably in the range of 3.0 to 8.5 mol-%.

Preferably the propylene copolymer (R-PP) has a melt flow rate MFR$_2$ (230° C.) in the range of 1.0 to 10.0 g/10 min, preferably in the range of 1.5 to 8.0 g/10 min, more preferably in the range of 2.0 to 6.0 g/10 min.

The xylene cold soluble (XCS) fraction measured according to according ISO 16152 (25° C.) of the propylene copolymer (R-PP) preferably is below 10.0 wt.-%, more preferably in the range from 1.0 to equal or below 8.0 wt.-%, still more preferably in the range from 1.5 to 7.0 wt.-%, more preferably in the range from 2.0 to 6.5 wt.-%.

The propylene copolymer (R-PP) preferably comprises at least two polymer fractions, like two or three polymer fractions; at least one of them is a propylene copolymer. Even more preferred the propylene copolymer (R-PP) comprises, preferably consists of, a first polypropylene fraction (PP1) and a second propylene copolymer fraction (R-PP2). It is especially preferred that the propylene copolymer (R-PP) comprises, preferably consists of, a first polypropylene fraction (PP1) and a second propylene copolymer fraction (R-PP2), wherein the comonomer content in the first polypropylene fraction (PP1) is at most 2.5 mol-%.

The weight ratio between the first polypropylene fraction (PP1) and the second propylene copolymer fraction (R-PP2)

[(PP1)/(R-PP2)] is in the range of 30/70 to 60/40, more preferably in the range of 30/70 to 50/50.

It is preferred that the first polypropylene fraction (PP1) is the comonomer lean fraction whereas the second propylene copolymer fraction (R-PP2) is the comonomer rich fraction. Accordingly in one preferred embodiment the comonomer content [in mol-%] in the propylene copolymer (R-PP) is higher than in the first polypropylene fraction (PP-1). Therefore in one specific preferred embodiment, the propylene copolymer (R-PP) comprises, preferably consists of, the first polypropylene fraction (PP1) being a propylene homopolymer (H-PP1) and the second propylene copolymer fraction (R-PP2).

Thus it is preferred that the first polypropylene fraction (PP1) has rather low comonomer content. It is especially preferred that the first polypropylene fraction (PP1) has a comonomer content of equal or below 2.0 mol-%, more preferably of equal or below 1.5 mol-%, yet more preferably equal or below 1.0 mol-%.

The first polypropylene fraction (PP1) can be a first propylene copolymer fraction (R-PP1) or a first propylene homopolymer fraction (H-PP1), the latter especially preferred.

The expression propylene homopolymer, e.g. the first propylene homopolymer (fraction) (H-PP1), used in the instant invention relates to a polypropylene that consists substantially, i.e. of more than 99.0 mol-%, such as at least 99.5 mol-%, still more preferably of at least 99.7 mol-%, of propylene units. In a preferred embodiment only propylene units in the propylene homopolymer, e.g. the first propylene homopolymer (fraction) (H-PP1), are detectable.

In case the first polypropylene fraction (PP1) is a first propylene copolymer fraction (R-PP1) it comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the first polypropylene fraction (PP1) comprises, especially consists of, monomers copolymerizable with propylene from the group consisting of ethylene, 1-butene and 1-hexene. More specifically the first polypropylene fraction (PP1) comprises—apart from propylene—units derivable from ethylene and/or 1-butene. In a preferred embodiment the first polypropylene fraction (PP1) comprises units derivable from ethylene and propylene only. The comonomer content in the first polypropylene fraction (PP1) is preferably in the range of equal or more than 1.0 to 2.0 mol-%, still more preferably in the range of more than 1.2 to 2.0 mol-%.

As the comonomer of the first polypropylene fraction (PP1) preferably is rather low, also its xylene cold soluble (XCS) is comparably low. Thus it is preferred that the amount of the xylene cold soluble (XCS) fraction of the first polypropylene fraction (PP1) is equal or below than 5.0 wt.-%, more preferably is in the range of 0.5 to 3.5 wt.-%, still more preferably is in the range of 0.8 to 2.5 wt.-%, yet more preferably is in the range of 0.8 to 1.5 wt.-%. The values are especially applicable in case the first polypropylene fraction (PP1) is the first propylene homopolymer fraction (H-PP1).

Preferably the first polypropylene fraction (PP1) has a melt flow rate $MFR_2$ (230° C.) in the range of 1.0 to 10.0 g/10 min, preferably in the range of 1.5 to 8.0 g/10 min, more preferably in the range of 2.0 to 6.0 g/10 min.

The second fraction of the propylene copolymer (R-PP) is a copolymer fraction, i.e. the second propylene copolymer fraction (R-PP2), having a higher comonomer content than the first polypropylene fraction (PP1).

It is especially preferred that the comonomer content between the propylene copolymer (R-PP) and the first polypropylene fraction (PP1) [(R-PP)–(PP1)] differs by at least 1.5 mol-%; more preferably by 1.5 to 12.0 mol-%, yet more preferably by 2.0 to 10.0 mol-%, still more preferably by 2.5 to 8.0 mol-%.

Thus it is preferred that the second propylene copolymer fraction (R-PP2) has a comonomer content of above 2.0 mol-%, more preferably in the range of 2.0 to 18.0 mol-%, like 4.0 to 18.0 mol-%, yet more preferably in the range of 3.0 to 10.0 mol-%, like in the range of 4.0 to 8.0 mol-%.

Accordingly it is further preferred that the comonomer content between the second propylene copolymer fraction (R-PP2) and the first polypropylene fraction (PP1) [(R-PP2)–(PP1)] differs by at least 3.0 mol-%, like by at least 5.5 mol-%; more preferably by 3.0 to 18.0 mol-%, like by 5.5 to 18.0 mol-%, yet more preferably by 6.0 to 15.0 mol-%, still more preferably by 6.5 to 12.0 mol-%.

The second propylene copolymer fraction (R-PP2) preferably comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the second propylene copolymer fraction (R-PP2) comprises, especially consists of, monomers copolymerizable with propylene from the group consisting of ethylene, 1-butene and 1-hexene. More specifically the second propylene copolymer fraction (R-PP2) comprises—apart from propylene—units derivable from ethylene and/or 1-butene. In a preferred embodiment the second propylene copolymer fraction (R-PP2) comprises units derivable from ethylene and propylene only.

In one particular preferred embodiment the propylene copolymer (R-PP) comprises, preferably consists of, the first propylene copolymer fraction (R-PP1) and the second propylene copolymer fraction (R-PP2), wherein both fractions comprises units derivable from propylene and ethylene only.

Still more preferably the melt flow rate between the first polypropylene fraction (PP1) and the second propylene copolymer fraction (R-PP2) differs. Preferably the melt flow rate $MFR_2$ (230° C.) of the first polypropylene fraction (PP1) is lower than the melt flow rate $MFR_2$ (230° C.) of the second propylene copolymer fraction (R-PP2). Accordingly it is preferred that the difference between the melt flow rate $MFR_2$ (230° C.) of the propylene copolymer (R-PP) and the melt flow rate $MFR_2$ (230° C.) of the first polypropylene fraction (PP1) [(R-PP)–(PP1)] differs by at least 0.5 g/10 min, more preferably by 0.5 to 5.0 g/10 min, still more preferably by 1.0 to 3.5 g/10 min.

Preferably the weight ratio between the matrix (M), i.e. the propylene copolymer (R-PP), and the elastomeric propylene copolymer (EC) is in the range of 19/1 to 70/30, more preferably in the range of 15/1 to 4/1, still more preferably in the range of 12/1 to 5/1.

Accordingly in one preferred embodiment, the heterophasic propylene copolymer (RAHECO) preferably comprises 70 to 95 wt.-%, more preferably 80 to 93 wt.-%, still more preferably 84.0 to 92.0 wt.-%, of the matrix (M), i.e. of the propylene copolymer (R-PP), based on the total weight of the heterophasic propylene copolymer (RAHECO).

Additionally, the heterophasic propylene copolymer (RAHECO) preferably comprises 5 to 30 wt.-%, more preferably 7 to 20 wt.-%, still more preferably 8 to 16 wt.-% of the elastomeric propylene copolymer (EC), based on the total weight of the heterophasic propylene copolymer (RAHECO).

Thus, it is appreciated that the heterophasic propylene copolymer (RAHECO) preferably comprises, more preferably consists of, 70 to 95 wt.-%, more preferably 80 to 93 wt.-%, still more preferably 84.0 to 92.0 wt.-%, of the matrix (M), i.e. of the propylene copolymer (R-PP) and 5 to 30 wt.-%, more preferably 7 to 20 wt.-%, still more preferably 8 to 16 wt.-% of the elastomeric propylene copolymer (EC), based on the total weight of the heterophasic propylene copolymer (RAHECO).

Accordingly, a further component of the heterophasic propylene copolymer (RAHECO) is the elastomeric propylene copolymer (EC) dispersed in the matrix (M). Concerning the comonomers used in the elastomeric propylene copolymer (EC) it is referred to the information provided for the heterophasic propylene copolymer (RAHECO). Accordingly the elastomeric propylene copolymer (EC) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably, the elastomeric propylene copolymer (EC) comprises, especially consists of, monomers copolymerizable with propylene from the group consisting of ethylene, 1-butene and 1-hexene. More specifically, the elastomeric propylene copolymer (EC) comprises—apart from propylene—units derivable from ethylene and/or 1-butene. Thus, in an especially preferred embodiment the elastomeric propylene copolymer (EC) comprises units derivable from ethylene and propylene only.

The comonomer content of the elastomeric propylene copolymer (EC) preferably is in the range of 18.0 to 60.0 mol.-%, still more preferably in the range of 25.0 to 50.0 mol.-%, yet more preferably in the range of 28.0 to 40.0 mol.-%, like in the range of 30.0 to 36.0 mol.-%.

The present invention is not only directed to the instant heterophasic propylene copolymer (RAHECO) but also to articles, preferably to an article selected from the group consisting of (medical) pouche, food packaging, film, like unoriented film, and bottle. Accordingly in a further embodiment the present invention is directed to an article, especially to an article selected from the group consisting of (medical) pouche, food packaging, film, like unoriented film (i.e. cast film or blown film, e.g. air cooled blown film), and bottle, comprising at least 70.0 wt.-%, preferably comprising at least 80.0 wt.-%, more preferably comprising at least 90.0 wt.-%, still more preferably comprising at least 95.0 wt.-%, yet more preferably comprising at least 99.0 wt.-%, of the instant heterophasic propylene copolymer (RAHECO).

One distinguishes between unoriented and oriented films (see for instance polypropylene handbook, Nello Pasquini, $2^{nd}$ edition, Hanser). Oriented films are typically monoaxially or biaxially oriented films, whereas unoriented films are cast or blown films. Accordingly an unoriented film is not drawn intensively in machine and/or transverse direction as done by oriented films. Thus the unoriented film according to this invention is not a monoaxially or biaxially oriented film. Preferably the unoriented film according to the instant invention is a blown film or cast film.

In one specific embodiment the unoriented film is a cast film or an air-cooled blown film.

Preferably the unoriented film has a thickness of 10 to 1000 μm, more preferably of 20 to 700 μm, like of 40 to 500 μm.

The present invention is also directed to the use of the heterophasic propylene copolymer (RAHECO) in the manufacture of an article selected from the group consisting of (medical) pouches, food packaging systems, films, like unoriented films (i.e. cast films or blown films, like air cooled blown films or water quenched blown films), and bottles.

Further the present invention is directed to a sterilisable or sterilised article, preferably to a sterilisable or sterilised film, like a sterilisable or sterilised unoriented film. More preferably the invention is directed to containers, i.e. pouches, especially to steam sterilisable or steam sterilised containers, i.e. pouches, preferably comprising, more preferably consisting of, the (unoriented) film as defined herein. The container is in particular a pouch. Further said container, i.e. pouch, has been preferably subjected to a steam sterilisation treatment in a temperature range of about 120 to 130° C.

The instant heterophasic propylene copolymer (RAHECO) is preferably produced in a multistage process comprising at least two reactors, preferably at least three reactors, connected in series.

Accordingly the heterophasic propylene copolymer (RAHECO) according to this invention is produced by polymerizing:

(I) propylene and an α-olefin different to propylene, preferably ethylene and/or $C_4$ to $C_8$ α-olefin, more preferably ethylene, so as to form the matrix (M) being the propylene copolymer (PP); and subsequently polymerizing (II) propylene and an α-olefin different to propylene, preferably ethylene, preferably in the gas phase, so as to form the elastomeric propylene copolymer (EC) dispersed in said matrix (M);

wherein preferably both steps (I) and (II) take place in the presence of the same single site solid particulate catalyst free from an external carrier, preferably a catalyst comprising (i) a complex of formula (I) as defined in detail below.

Preferably the heterophasic propylene copolymer (RAHECO) is obtained by a sequential polymerization process comprising the steps of (a) polymerizing in a first reactor propylene and optionally ethylene and/or $C_4$ to $C_8$ α-olefin obtaining thereby a first polypropylene fraction (PP1), preferably polymerizing in a first reactor propylene thereby obtaining a first propylene homopolymer fraction (H-PP1), (b) transferring said first polypropylene fraction (PP1), preferably said first propylene homopolymer fraction (H-PP1), in a second reactor, (c) polymerizing in said second reactor in the presence of the first polypropylene fraction (PP1), preferably in the presence of the first propylene homopolymer fraction (H-PP1), propylene and ethylene and/or $C_4$ to $C_8$ α-olefin obtaining a second propylene copolymer fraction (R-PP2), said first polypropylene fraction (PP1), preferably said first propylene homopolymer fraction (H-PP1), and said second propylene copolymer fraction (R-PP2) form the matrix (M), i.e. the propylene copolymer (R-PP), (d) transferring said matrix (M) in a third reactor, (e) polymerizing in said third reactor in the presence of the matrix (M) propylene and ethylene and/or $C_4$ to $C_8$ α-olefin obtaining an elastomeric propylene copolymer (EC), said matrix (M) and said elastomeric propylene copolymer (EC) form the heterophasic propylene copolymer (RAHECO), wherein preferably the steps take place in the presence of the same single site solid particulate catalyst free from an external carrier, preferably a catalyst comprising (i) a complex of formula (I) as defined in detail below.

For preferred embodiments of the heterophasic propylene copolymer (HECO), the propylene copolymer (R-PP), the first polypropylene fraction (PP1), like the first propylene homopolymer fraction (H-PP1), the second propylene copolymer fraction (R-PP2), and the elastomeric copolymer (EC) reference is made to the definitions given above.

The term "sequential polymerization process" indicates that the heterophasic propylene copolymer (HECO) is produced in at least two, like three, reactors connected in series. Accordingly the present process comprises at least a first reactor, a second reactor, and optionally a third reactor. The term "polymerization process" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization process.

The first reactor is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

The second reactor and the third reactor are preferably gas phase reactors. Such gas phase reactors can be any mechanically mixed or fluid bed reactors. Preferably the gas phase reactors comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor is a slurry reactor, like loop reactor, whereas the second reactor and the third reactor are gas phase reactors (GPR). Accordingly for the instant process at least three, preferably three polymerization reactors, namely a slurry reactor, like loop reactor, a first gas phase reactor and a second gas phase reactor are connected in series are used. If needed prior to the slurry reactor a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (RAHECO) as defined above the conditions for the first reactor, i.e. the slurry reactor, like a loop reactor, may be as follows:
the temperature is within the range of 50° C. to 110° C., preferably between 60° C. and 100° C., more preferably between 65 and 95° C.,
the pressure is within the range of 20 bar to 80 bar, preferably between 40 bar to 70 bar,
hydrogen can be added for controlling the molar mass in a manner known per se.

Subsequently, the reaction mixture of the first reactor is transferred to the second reactor, i.e. gas phase reactor, where the conditions are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The condition in the third reactor is similar to the second reactor.

The residence time can vary in the three reactors.

In one embodiment of the process for producing the heterophasic propylene copolymer (RAHECO) the residence time in bulk reactor, e.g. loop is in the range 0.1 to 2.5 hours, e.g. 0.15 to 1.5 hours and the residence time in gas phase reactor will generally be 0.2 to 6.0 hours, like 0.3 to 4.0 hours.

If desired, the polymerization may be effected in a known manner under supercritical conditions in the first reactor, i.e. in the slurry reactor, like in the loop reactor, and/or as a condensed mode in the gas phase reactors.

In the following the catalyst component is defined in more detail. Preferably the catalyst comprises (i) a complex of formula (I):

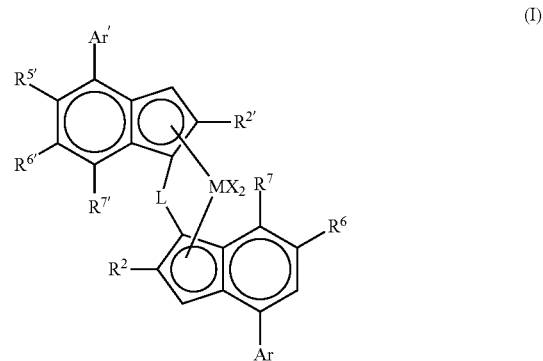

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$ hydrocarbyl radical optionally containing one or more heteroatoms from groups 14-16;
$R^{5'}$ is a $C_{1-20}$ hydrocarbyl group containing one or more heteroatoms from groups 14-16 optionally substituted by one or more halo atoms;
$R^6$ and $R^{6'}$ are each independently hydrogen or a $C_{1-20}$ hydrocarbyl group optionally containing one or more heteroatoms from groups 14-16;
$R^7$ and $R^{7'}$ are each independently hydrogen or $C_{1-20}$ hydrocarbyl group optionally containing one or more heteroatoms from groups 14-16;
Ar is independently an aryl or heteroaryl group having up to 20 carbon atoms optionally substituted by one or more groups $R^1$;

Ar' is independently an aryl or heteroaryl group having up to 20 carbon atoms optionally substituted by one or more groups $R^1$;

each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;

each $R^4$ is a $C_{1-20}$ hydrocarbyl group;

and (ii) a cocatalyst comprising a compound of a group 13 metal, e.g. Al or boron compound.

The catalyst used in the process of the invention is in solid particulate form free from an external carrier. Ideally, the catalyst is obtainable by a process in which (a) a liquid/liquid emulsion system is formed, said liquid/liquid emulsion system comprising a solution of the catalyst components (i) and (ii) dispersed in a solvent so as to form dispersed droplets; and (b) solid particles are formed by solidifying said dispersed droplets.

Viewed from another aspect therefore, the invention provides a process for the preparation of an heterophasic propylene copolymer (RAHECO) as hereinbefore defined in which the catalyst as hereinbefore defined is prepared by obtaining (i) a complex of formula (I) and a cocatalyst (ii) as hereinbefore described;

forming a liquid/liquid emulsion system, which comprises a solution of catalyst components (i) and (ii) dispersed in a solvent, and solidifying said dispersed droplets to form solid particles.

The term $C_{1-20}$ hydrocarbyl group includes $C_{1-20}$ alkyl, $C_{2-20}$alkenyl, $C_{2-20}$ alkynyl, $C_{3-20}$ cycloalkyl, $C_{3-20}$ cycloalkenyl, $C_{6-20}$ aryl groups, $C_{7-20}$alkylaryl groups or $C_{7-20}$ arylalkyl groups or of course mixtures of these groups such as cycloalkyl substituted by alkyl.

Unless otherwise stated, preferred $C_{1-20}$ hydrocarbyl groups are $C_{1-20}$ alkyl, $C_{4-20}$ cycloalkyl, $C_{5-20}$ cycloalkylalkyl groups, $C_{7-20}$alkylaryl groups, $C_{7-20}$ arylalkyl groups or $C_{6-20}$ aryl groups, especially $C_{1-10}$ alkyl groups, $C_{6-10}$ aryl groups, or $C_{7-12}$ arylalkyl groups, e.g. $C_{1-8}$ alkyl groups. Most especially preferred hydrocarbyl groups are methyl, ethyl, propyl, isopropyl, tertbutyl, isobutyl, $C_{5-6}$-cycloalkyl, cyclohexylmethyl, phenyl or benzyl.

The term halo includes fluoro, chloro, bromo and iodo groups, especially chloro groups, when relating to the complex definition.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands can vary greatly.

Such catalysts are described in WO2013/007650 which is incorporated herein by reference. Thus, preferred complexes of use in the invention are of formula (II') or (II)

wherein
  M is zirconium or hafnium;
  each X is a sigma ligand, preferably each X is independently a hydrogen atom, a halogen atom, $C_{1-6}$ alkoxy group, $C_{1-6}$ alkyl, phenyl or benzyl group;
  L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$ alkyl, $C_{3-10}$ cycloalkyl, tri($C_{1-20}$-alkyl)silyl, $C_{6-20}$-aryl, $C_{7-20}$ arylalkyl or $C_{7-20}$ alkylaryl;
  each $R^2$ or $R^{2'}$ is a $C_{1-10}$ alkyl group;
  $R^{5'}$ is a $C_{1-10}$ alkyl group or Z'R$^{3'}$ group;
  $R^6$ is hydrogen or a $C_{1-10}$ alkyl group;
  $R^{6'}$ is a $C_{1-10}$ alkyl group or $C_{6-10}$ aryl group;
  $R^7$ is hydrogen, a $C_{1-6}$ alkyl group or ZR$^3$ group;
  $R^{7'}$ is hydrogen or a $C_{1-10}$ alkyl group;
  Z and Z' are independently O or S;
  $R^{3'}$ is a $C_{1-10}$ alkyl group, or a $C_{6-10}$ aryl group optionally substituted by one or more halo groups;
  $R^3$ is a $C_{1-10}$-alkyl group;
  each n is independently 0 to 4, e.g. 0, 1 or 2;
  and each $R^1$ is independently a $C_{1-20}$ hydrocarbyl group, e.g. $C_{1-10}$ alkyl group.

Further preferred complexes of use in the invention are of formula (III') or (III):

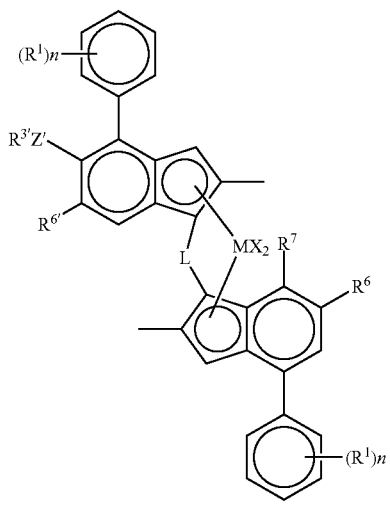 (III')

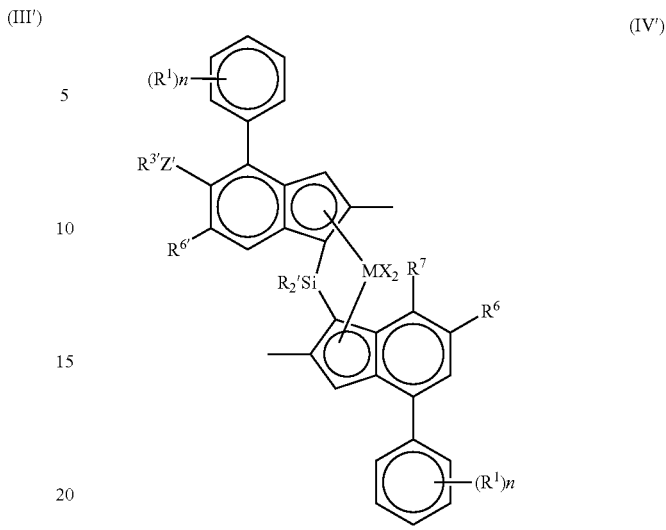 (IV')

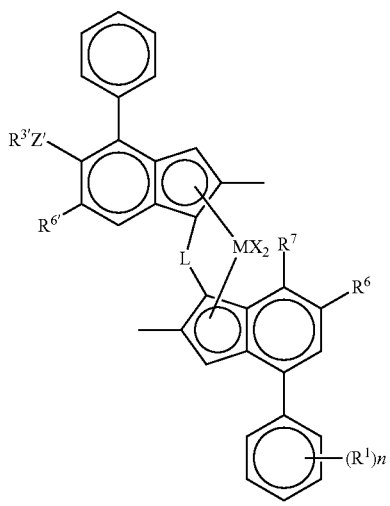 (III)

(IV)

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C— or —R'$_2$Si— wherein each R' is independently a hydrogen atom, $C_{1-20}$ alkyl or $C_{3-10}$ cycloalkyl;

$R^6$ is hydrogen or a $C_{1-10}$ alkyl group;

$R^{6'}$ is a $C_{1-10}$ alkyl group or $C_{6-10}$ aryl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0 to 4, e.g. 0, 1 or 2; and each $R^1$ is independently a $C_{1-10}$ alkyl group.

Further preferred complexes of use in the invention are of formula (IV') or (IV):

M is zirconium or hafnium;

each X is a sigma ligand, preferably each X is independently a hydrogen atom, a halogen atom, $C_{1-6}$-alkoxy group, $C_{1-6}$-alkyl, phenyl or benzyl group;

each R' is independently a hydrogen atom, $C_{1-20}$ alkyl or $C_{3-7}$ cycloalkyl;

$R^6$ is hydrogen or a $C_{1-10}$ alkyl group;

$R^{6'}$ is a $C_{1-10}$ alkyl group or $C_{6-10}$ aryl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0, 1 to 2; and each $R^1$ is independently a $C_{3-8}$ alkyl group.

Most especially, the complex of use in the invention is of formula (V') or (V):

(V')

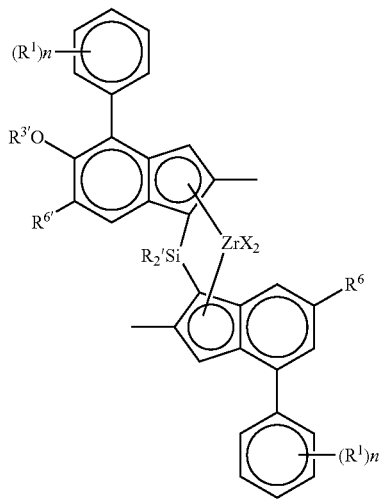

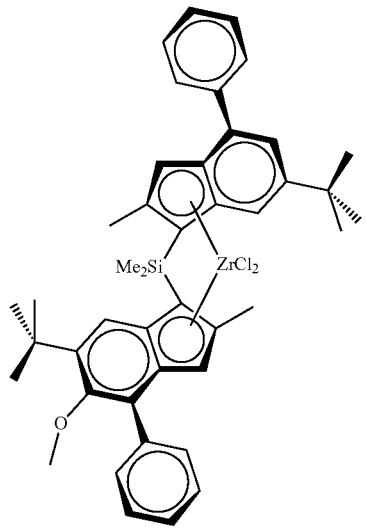

rac-anti-Me$_2$Si(2-Me-4-Ph-6-tBu-Ind)(2-Me-4-Ph-5-OMe-6-tBu-Ind)ZrCl$_2$ (V)

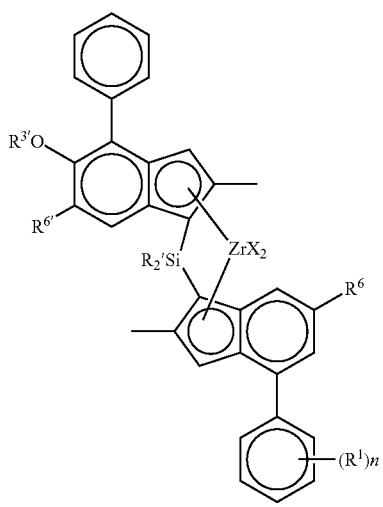

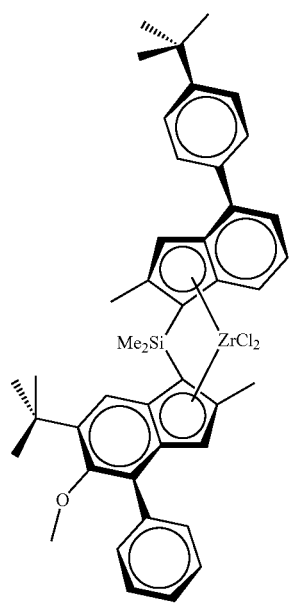

wherein each X is a sigma ligand, preferably each X is independently a hydrogen atom, a halogen atom, $C_{1-6}$-alkoxy group, $C_{1-6}$-alkyl, phenyl or benzyl group;

R' is independently a $C_{1-6}$ alkyl or $C_{3-10}$ cycloalkyl;

$R^1$ is independently $C_{3-8}$ alkyl;

$R^6$ is hydrogen or a $C_{3-8}$ alkyl group;

$R^{6'}$ is a $C_{3-8}$ alkyl group or $C_{6-10}$ aryl group;

$R^{3'}$ is a $C_{1-6}$ alkyl group, or $C_{6-10}$ aryl group optionally substituted by one or more halo groups; and n is independently 0, 1 or 2.

Particular compounds of the invention include:

rac-anti-Me$_2$Si(2-Me-4-(p-tBuPh)-Ind)(2-Me-4-Ph-5-OMe-6-tBu-Ind)ZrCl$_2$

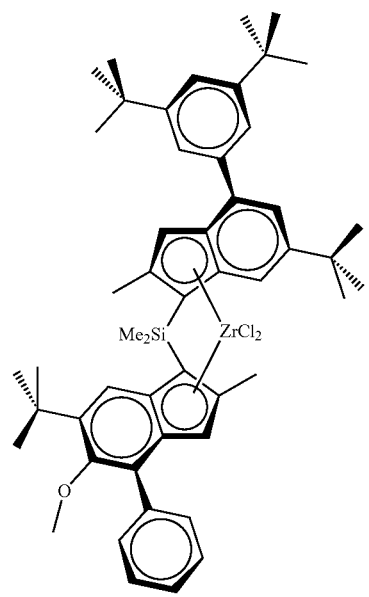
rac-anti-Me$_2$Si(2-Me-4-(3,5-di-tBuPh)-6-tBu-Ind)(2-Me-4-Ph-5-OMe-6-tBu-Ind)ZrCl$_2$
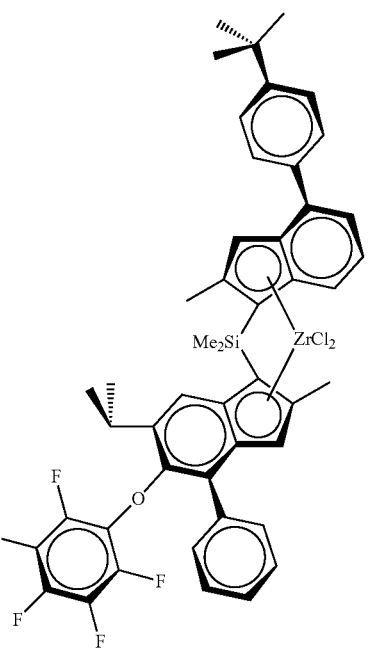
rac-anti-Me$_2$Si(2-Me-4-(p-tBuPh)-Ind)(2-Me-4-Ph-5-OC$_6$F$_5$)-6-iPr-Ind)ZrCl$_2$
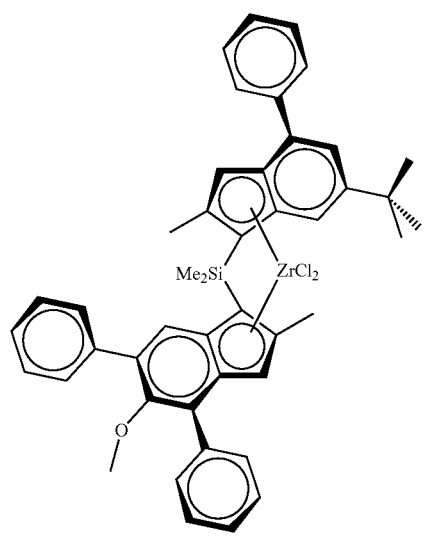
rac-anti-Me$_2$Si(2-Me-4-Ph-6-tBu-Ind)(2-Me-4,6-di-Ph-5-OMe-Ind)ZrCl$_2$
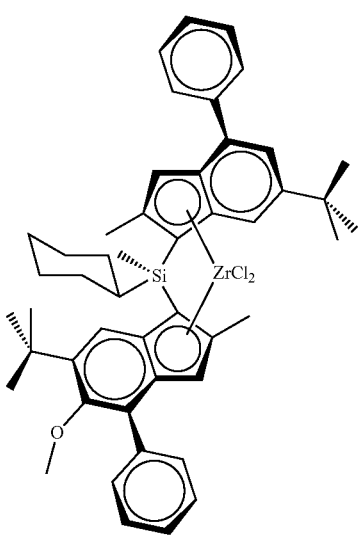
rac-anti-Me(CyHex)Si(2-Me-4-Ph-6-tBu-Ind)(2-Me-4-Ph-5-OMe-6-tBu-Ind)ZrCl$_2$

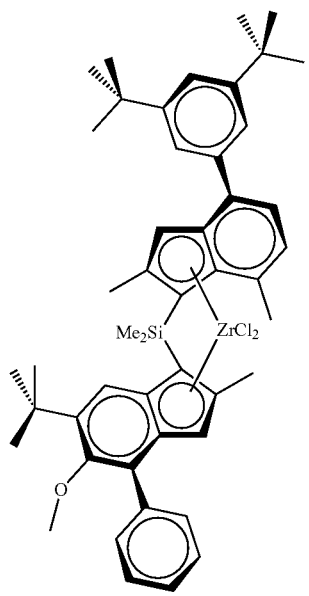
rac-anti-Me₂Si(2-Me-4-(3,5-di-tBuPh)-7-Me-Ind)(2-Me-4-Ph-5-OMe-6-tBu-Ind)ZrCl₂
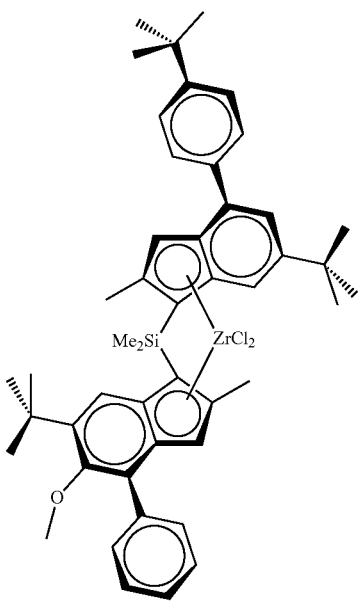
rac-anti-Me₂Si(2-Me-4-(p-tBuPh)-6-tBu-Ind)(2-Me-4-Ph-5-OMe-6-tBu-Ind)ZrCl₂
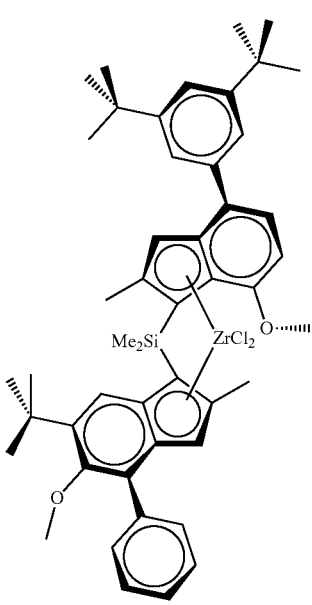
rac-anti-Me₂Si(2-Me-4-(3,5-di-tBuPh)-7-OMe-Ind)(2-Me-4-Ph-5-OMe-6-tBu-Ind)ZrCl₂
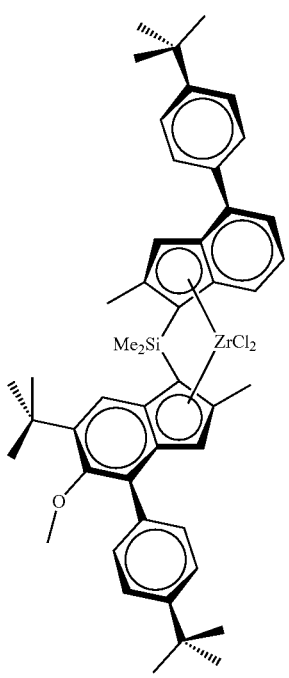
rac-anti-Me₂Si(2-Me-4-(p-tBuPh)-Ind)(2-Me-4-(4-tBuPh)-5-OMe-6-tBu-Ind)ZrCl₂

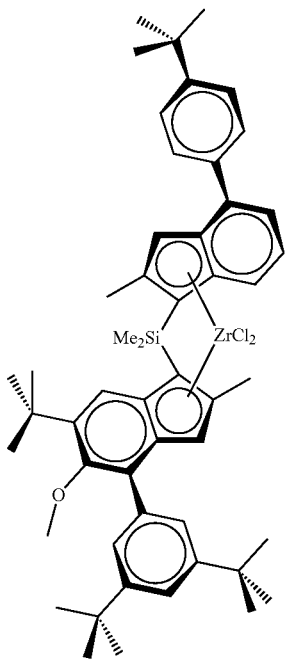

rac-anti-Me$_2$Si(2-Me-4-(p-tBuPh)-Ind)(2-Me-4-(3,5-tBu2Ph)-5-OMe-6-tBu-Ind)ZrCl$_2$

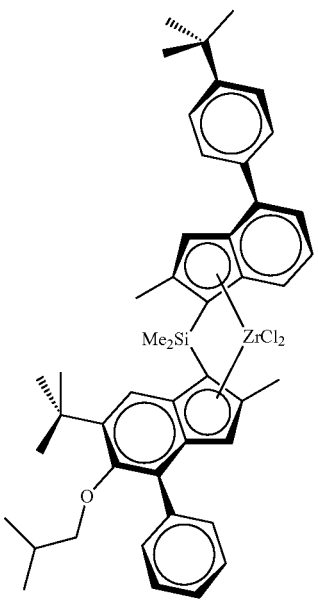

rac-anti-Me$_2$Si(2-Me-4-(p-tBuPh)-Ind)(2-Me-4-Ph-5-OiBu-6-tBu-Ind)ZrCl$_2$

The synthesis of these materials is discussed in WO2013/007650.

Cocatalyst

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention. Thus the cocatalyst is preferably an alumoxane, like MAO. Borate cocatalysts can also be employed. The use of B(C$_6$F$_5$)$_3$, C$_6$H$_5$N(CH$_3$)$_2$H:B(C$_6$F$_5$)$_4$, (C$_6$H$_5$)$_3$C: B(C$_6$F$_5$)$_4$ or Ni(CN)$_4$[B(C$_6$F$_5$)$_3$]$_4^{2-}$ is especially preferred. Suitable cocatalysts are described in WO2013/007650.

Suitable amounts of cocatalyst will be well known to the skilled man.

Manufacture

The catalyst used to manufacture the heterophasic copolymers of the invention is ideally provided in solid particulate form but unsupported, i.e. no external carrier is used. In order to provide the catalyst of the invention in solid form but without using an external carrier, it is preferred if a liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape and particle size and without using any added external porous support material, such as an inorganic oxide, e.g. silica. Also desirable surface properties can be obtained. WO2013/007650 again contains comprehensive details of this process.

Catalyst Prepolymerisation

The use of the heterogeneous, non-supported catalysts, (i.e. "self-supported" catalysts) might have, as a drawback, a tendency to dissolve to some extent in the polymerisation media, i.e. some active catalyst components might leach out of the catalyst particles during slurry polymerisation, whereby the original good morphology of the catalyst might be lost. These leached catalyst components are very active possibly causing problems during polymerisation. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerisation which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerise" the catalyst before using it in polymerisation process. It has to be noted that prepolymerisation in this regard is part of the catalyst preparation process, being a step carried out after a solid catalyst is formed. This catalyst prepolymerisation step is not part of the actual polymerisation configuration, which might comprise a conventional process prepolymerisation step as well. After the catalyst prepolymerisation step, a solid catalyst is obtained and used in polymerisation.

Catalyst "prepolymerisation" takes place following the solidification step of the liquid-liquid emulsion process hereinbefore described. Prepolymerisation may take place by known methods described in the art, such as that described in WO 2010/052263, WO 2010/052260 or WO 2010/052264. Preferable embodiments of this aspect of the invention are described herein.

As monomers in the catalyst prepolymerisation step preferably alpha-olefins are used. Preferable C$_2$-C$_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene.

The catalyst prepolymerisation may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per) fluorinated hydrocarbons is typically in the range of 0 to 140° C., preferably 30 to 120° C., like 50 to 110° C.

Where the catalyst prepolymerisation is done in fluorinated hydrocarbons, the temperature for the prepolymerisation step is below 70° C., e.g. in the range of −30 to 70° C., preferably 0-65° C. and more preferably in the range 20 to 55° C.

Pressure within the prepolymerisation vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerisation vessel is preferably kept in an inert atmosphere, such as under nitrogen or argon or similar atmosphere.

Prepolymeristaion is continued until the prepolymerisation degree defined as weight of polymer matrix/weight of solid catalyst before prepolymerisation step is reached. The degree is below 25, preferably 0.5 to 10.0, more preferably 1.0 to 8.0, most preferably 2.0 to 6.0.

Use of the catalyst prepolymerisation step offers the advantage of minimising leaching of catalyst components and thus local overheating.

After prepolymerisation, the catalyst can be isolated and stored.

In the following the present invention is further illustrated by means of examples.

EXAMPLES

1. Measuring Methods

The following definitions of terms and determination methods apply for the above general description of the invention as well as to the below examples unless otherwise defined.

Calculation of comonomer content of the second propylene copolymer fraction (R-PP2):

$$\frac{C(PP) - w(PP1) \times C(PP1)}{w(PP2)} = C(PP2) \quad \text{(I)}$$

wherein
w(PP1) is the weight fraction [in wt.-%] of the first polypropylene fraction (PP1),
w(PP2) is the weight fraction [in wt.-%] of the second propylene copolymer fraction (R-PP2),
C(PP1) is the comonomer content [in mol-%] of the first polypropylene fraction (PP1),
C(PP) is the comonomer content [in mol-%] of the propylene copolymer (R-PP),
C(PP2) is the calculated comonomer content [in mol-%] of the second propylene copolymer fraction (R-PP2).

Calculation of the xylene cold soluble (XCS) content of the second propylene copolymer fraction (R-PP2):

$$\frac{XS(PP) - w(PP1) \times XS(PP1)}{w(PP2)} = XS(PP2) \quad \text{(II)}$$

wherein
w(PP1) is the weight fraction [in wt.-%] of the first polypropylene fraction (PP1),
w(PP2) is the weight fraction [in wt.-%] of the second propylene copolymer fraction (R-PP2),
XS(PP1) is the xylene cold soluble (XCS) content [in wt.-%] of the first polypropylene fraction (PP1),
XS(PP) is the xylene cold soluble (XCS) content [in wt.-%] of the propylene copolymer (R-PP),
XS(PP2) is the calculated xylene cold soluble (XCS) content [in wt.-%] of the second propylene copolymer fraction (R-PP2).

Calculation of melt flow rate MFR$_2$ (230° C.) of the second propylene copolymer fraction (R-PP2):

$$MFR(PP2) = 10^{\left[\frac{\log(MFR(PP)) - w(PP1) \times \log(MFR(PP1))}{w(PP2)}\right]} \quad \text{(III)}$$

wherein
w(PP1) is the weight fraction [in wt.-%] of the first polypropylene fraction (PP1),
w(PP2) is the weight fraction [in wt.-%] of second propylene copolymer fraction (R-PP2),
MFR(PP1) is the melt flow rate MFR$_2$ (230° C.) [in g/10 min] the first polypropylene fraction (PP1),
MFR(PP) is the melt flow rate MFR$_2$ (230° C.) [in g/10 min] of the propylene copolymer (R-PP),
MFR(PP2) is the calculated melt flow rate MFR$_2$ (230° C.) [in g/10 min] of the second propylene copolymer fraction (R-PP2).

Calculation of comonomer content of the elastomeric propylene copolymer (EC), respectively:

$$\frac{C(RAHECO) - w(PP) \times C(PP)}{w(EC)} = C(EC) \quad \text{(IV)}$$

wherein
w(PP) is the weight fraction [in wt.-%] of the propylene copolymer (R-PP), i.e. polymer produced in the first and second reactor (R1+R2),
w(EC) is the weight fraction [in wt.-%] of the elastomeric propylene copolymer (EC), i.e. polymer produced in the third and optionally fourth reactor (R3+R4)
C(PP) is the comonomer content [in mol-%] of the propylene copolymer (R-PP), i.e. comonomer content [in wt.-%] of the polymer produced in the first and second reactor (R1+R2),
C(RAHECO) is the comonomer content [in mol-%] of the heterophasic propylene copolymer (RAHECO),
C(EC) is the calculated comonomer content [in mol-%] of elastomeric propylene copolymer (EC), i.e. of the polymer produced in the third and optionally fourth reactor (R3+R4).

MFR$_2$ (230° C.) is measured according to ISO 1133 (230° C., 2.16 kg load).

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}$C {$^{1}$H} NMR spectra were recorded in the solution-state using a Bruker Advance III 400 NMR spectrometer operating at 400.15 and 100.62 MHz for $^{1}$H and $^{13}$C respectively. All spectra were recorded using a $^{13}$C optimised 10 mm extended temperature probehead at 125° C.

using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}$C {$^{1}$H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}$C {$^{1}$H} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Intrinsic viscosity is measured according to DIN ISO 1628/1, October 1999 (in Decalin at 135° C.).

The xylene solubles (XCS, wt.-%): Content of xylene cold solubles (XCS) is determined at 25° C. according ISO 16152; first edition; Jun. 1, 2005. The part which remains insoluble is the xylene cold insoluble (XCI) fraction.

The hexane extractable fraction is determined according to FDA method (federal registration, title 21, Chapter 1, part 177, section 1520, s. Annex B) on cast films of 100 μm thickness produced on a monolayer cast film line with a melt temperature of 220° C. and a chill roll temperature of 20° C. The extraction was performed at a temperature of 50° C. and an extraction time of 30 min.

Melting temperature (T$_m$) and heat of fusion (H$_f$), crystallization temperature (T$_c$) and heat of crystallization (H$_c$): measured with Mettler TA820 differential scanning calorimetry (DSC) on 5 to 10 mg samples. DSC is run according to ISO 11357-3:1999 in a heat/cool/heat cycle with a scan rate of 10° C./min in the temperature range of +23 to +210° C. Crystallization temperature and heat of crystallization (H$_c$) are determined from the cooling step, while melting temperature and heat of fusion (H$_f$) are determined from the second heating step.

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Sealing initiation temperature (SIT); (sealing end temperature (SET), sealing range): The method determines the sealing temperature range (sealing range) of polypropylene films, in particular blown films or cast films. The sealing temperature range is the temperature range, in which the films can be sealed according to conditions given below. The lower limit (heat sealing initiation temperature (SIT)) is the sealing temperature at which a sealing strength of >3 N is achieved. The upper limit (sealing end temperature (SET)) is reached, when the films stick to the sealing device. The sealing range is determined on a J&B Universal Sealing Machine Type 3000 with a film of 50 μm thickness with the following further parameters:

| | |
|---|---|
| Specimen width: | 25.4 mm |
| Seal Pressure: | 0.1 N/mm$^2$ |
| Seal Time: | 0.1 sec |
| Cool time: | 99 sec |
| Peel Speed: | 10 mm/sec |
| Start temperature: | 80° C. |
| End temperature: | 150° C. |
| Increments: | 10° C. |

Specimen is sealed A to A at each sealbar temperature and seal strength (force) is determined at each step. The temperature is determined at which the seal strength reaches 3 N.

Tensile modulus in machine and transverse direction was determined according to ISO 527-3 at 23° C. on cast films of 50 μm thickness produced on a monolayer cast film line with a melt temperature of 220° C. and a chill roll temperature of 20° C. Testing was performed at a cross head speed of 1 mm/min.

Flexural Modulus: The flexural modulus was determined in 3-point-bending according to ISO 178 on 80×10×4 mm$^3$ test bars injection molded at 23° C. in line with EN ISO 1873-2.

Charpy notched impact strength is determined according to ISO 179 1eA at 23°, and at −20° C. by using an 80×10×4 mm$^3$ test bars injection molded in line with EN ISO 1873-2.

Total Penetration Energy: The impact strength of films is determined by the "Dynatest" method according to ISO 7725-2 on films as described for the tensile modulus. The value "Wbreak" [J/mm] represents the total penetration energy per mm thickness that a film can absorb before it breaks. The higher this value, the tougher is the material.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

2. Examples

The catalyst used in the polymerization processes for the heterophasic propylene copolymer (RAHECO) of the inventive example (IE1) was prepared as follows:

The catalyst used has been prepared following the general procedures described in WO2013/007650 to prepare catalyst E2P, using the same metallocene complex (E2 in WO2013/007650) rac-anti-dimethylsilanediyl(2-methyl-4-(4'-tert-butylphenyl)inden-1-yl)(2-methyl-4-phenyl-5-methoxy-6-tert-butylinden-1-yl) zirconium dichloride (MC1). Its composition is indicated in table 1 below:

TABLE 1

| Catalyst | Al/Zr (molar ratio) in unprepped catalys | Degree of prepping | MC in prepped cat |
| --- | --- | --- | --- |
| MC1 | 250 | 3.5 | 1.12 |

Catalyst Synthesis:

Inside the glovebox, 80.0 μl of dry and degassed FluorN 474 was mixed with 2 mL of MAO in a septum bottle and left to react overnight. The following day, 58.7 mg of the metallocene (0.076 mmol, 1 equivalent) was dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.81 g of a red solid catalyst was obtained.

Catalyst off-line prepolymerization (Prepping): The above catalyst was pre-polymerised according to the following procedure: Off-line pre-polymerisation experiment was done in a 125 mL pressure reactor equipped with gas-feeding lines and an overhead stirrer. Dry and degassed perfluoro-1.3-dimethylcyclohexane (15 cm$^3$) and 801.7 mg of the catalyst to be pre-polymerised were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor.

The propylene feed was left open and the monomer consumption was compensated by keeping the total pressure in the reactor constant (about 5 barg). The experiment was continued until a polymerisation time (17 min.) sufficient to provide the desired degree of polymerisation (DP=3.5). The reaction was stopped by flashing the volatile components. Inside the glove box, the reactor was opened and the content poured into a glass vessel. The perfluoro-1.3-dimethylcyclohexane was evaporated until a constant weight was obtained to yield 3.59 g of the pre-polymerised catalyst.

The catalyst used in the polymerization processes for the heterophasic propylene copolymers (RAHECO) of the comparative examples CE1 to CE3 was prepared as follows:

Used Chemicals:

20% solution in toluene of butyl ethyl magnesium (Mg(Bu)(Et), BEM), provided by

Chemtura 2-ethylhexanol, provided by Amphochem

3-Butoxy-2-propanol—(DOWANOL™ PnB), provided by Dow bis(2-ethylhexyl)citraconate, provided by SynphaBase TiCl$_4$, provided by Millenium Chemicals Toluene, provided by Aspokem Viscoplex® 1-254, provided by Evonik Heptane, provided by Chevron Preparation of a Mg Alkoxy Compound Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCl$_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethyl-aluminium (TEAL) as co-catalyst and cyclohexylmethyl dimethoxy silane (C-Donor) as donor.

The aluminium to donor ratio, the aluminium to titanium ratio and the polymerization conditions are indicated in table 1.

The catalyst used in the polymerization processes of the comparative example (CE4) was the catalyst of the example section of WO 2010009827 A1 (see pages 30 and 31) along with triethyl-aluminium (TEAL) as co-catalyst and dicyclo pentyl dimethoxy silane (D-donor) as donor.

TABLE 2

Polymerization conditions

|  |  | IE 1 | CE 1 | CE 2 | CE 3 | CE 4 |
|---|---|---|---|---|---|---|
| TEAL/Ti | [mol/mol] | — | 302 | 220 | 215 | 200 |
| TEAL/donor | [mol/mol] | — | 7.5 | 6.1 | 6.2 | 6.5 |
| Temperature Loop | [° C.] | 30 | 20 | 31 | 29 | 31 |
| Temperature | [° C.] | 70 | 70 | 70 | 70 | 70 |
| Split | [%] | 32 | 26 | 33 | 34 | 29 |
| H2/C3 ratio | [mol/kmol] | 0.18 | 0.6 | 0.5 | 0.5 | 1.1 |
| C2/C3 ratio | [mol/kmol] | 0 | 4.7 | 5.7 | 5.7 | 5.5 |
| MFR$_2$ | [g/10 min] | 1.8 | 3.9 | 4.0 | 4.2 | 3.5 |
| XCS | [wt.-%] | 1.6 | 4.8 | 9.8 | 9.6 | 8.5 |
| C2 content GPR 1 | [mol-%] | 0 | 3.3 | 4.4 | 4.0 | 3.1 |
| Temperature | [° C.] | 80 | 80 | 80 | 80 | 80 |
| Pressure | [kPa] | 2600 | 2001 | 2500 | 2500 | 2257 |
| Split | [%] | 58.7 | 61 | 54 | 54 | 57 |
| H2/C3 ratio | [mol/kmol] | 4.0 | 9.0 | 7.8 | 6.2 | 25.0 |
| C2/C3 ratio | [mol/kmol] | 192.2 | 35.0 | 26.3 | 26.3 | 37.8 |
| MFR$_2$ | [g/10 min] | 3.3 | 3.5 | 6.3 | 3.5 | 4.7 |
| XCS | [wt-%] | 3.9 | 7.1 | 8.1 | 8.4 | 6.2 |
| C2 content GPR 2 | [mol-%] | 5.4 | 5.5 | 6.0 | 5.5 | 5.6 |
| Temperature | [° C.] | 70 | 75 | 75 | 75 | 75 |
| Split | [%] | 9.3 | 13 | 13 | 12 | 13 |
| C2/C3 ratio | [mol/kmol] | 1528 | 494 | 555 | 537 | 517 |
| H2/C2 ratio | [mol/kmol] | 0.6 | 516 | 502 | 470 | 500 |
| MFR$_2$ | [g/10 min] | 3.2 | 4.1 | 4.9 | 3.8 | 4.6 |
| XCS | [wt.-%] | 20.6 | 19.7 | 20.5 | 19.8 | 19.4 |
| C2 content | [mol-%] | 11.5 | 11.5 | 13.2 | 12.5 | 12.0 |

C2 ethylene
H$_2$/C3 ratio hydrogen/propylene ratio
C2/C3 ratio ethylene/propylene ratio
½ GPR ½ gas phase reactor
Loop Loop reactor

TABLE 3

Properties

|  |  | IE 1 | CE 1 | CE 2 | CE 3 | CE 4 |
|---|---|---|---|---|---|---|
| MFR$_2$ | [g/10 min] | 3.2 | 4.1 | 4.9 | 3.8 | 4.6 |
| Tm | [° C.] | 146 | 144 | 142 | 143 | 141 |
| Tg(1) of M | [° C.] | −4.1 | −5.1 | −4 | −4.1 | −4.1 |
| Tg(2) of E | [° C.] | −48.1 | −52.4 | −56 | −56 | −54.1 |
| C2 total | [mol-%] | 11.5 | 11.5 | 13.2 | 12.5 | 12.0 |
| XCS | [wt.-%] | 20.6 | 19.7 | 20.5 | 19.8 | 19.4 |
| IV of XCS | [dl/g] | 1.9 | 1.2 | 1.3 | 1.3 | 1.3 |
| C2 of XCS | [mol-%] | 33.6 | 39.7 | 41.9 | 40.8 | 39.0 |
| C2 of XCI | [mol-%] | 5.8 | 4.6 | 5.8 | 5.5 | 5.5 |
| Mw of XCI | [kg/mol] | 244 | 255 | 246 | 235 | 242 |
| MWD of XCI | [—] | 4.2 | 5.2 | 5.2 | 5.4 | 5.3 |
| C6 (FDA). 100 μm CF | [wt-%] | 1.42 | 3.43 | 4.26 | 4.08 | 2.75 |
| Flex. Mod. 23° C. | [MPa] | 484 | 608 | 561 | 575 | 576 |
| Charpy NIS. 23° C. | [kJ/m$^2$] | 14.8 | 14.1 | 13.2 | 14.5 | 11.4 |
| Charpy NIS. −20° C. | [kJ/m$^2$] | 1.6 | 1.1 | 1.1 | 1.1 | 1.1 |
| Tens. Mod. (film, MD). 23° C. | [MPa] | 318 | 330 | 322 | 335 | 340 |
| Tens. Mod. (film, TD). 23° C. | [MPa] | 341 | 368 | 290 | 306 | 301 |
| Wbreak (Dynatest) 23° C. | [J/mm] | 52.2 | 35.6 | 59.7 | 52.1 | 52.2 |
| Wbreak (Dynatest) 0° C. | [J/mm] | 19.6 | 10.9 | 15.4 | 18.2 | 15.9 |
| SIT | [° C.] | 112 | n.d. | 117 | n.d. | 114 |
| Tm − SIT | [° C.] | 34 | n.d. | 25 | n.d. | 27 | n.d.—not determined

All polymer powders were compounded in a co-rotating twin-screw extruder Coperion ZSK 57 at 220° C. with 0.2 wt.-% of Irganox B225 (1:1-blend of Irganox 1010 (Pentaerythrityl-tetrakis(3-(3',5'-di-tert.butyl-4-hydroxytoluyl)-propionate and tris (2,4-di-t-butylphenyl) phosphate) phosphite) of BASF AG, Germany) and 0.1 wt.-% calcium stearate.

The invention claimed is:

1. Heterophasic propylene copolymer (RAHECO) comprising:
    (i) a matrix (M) being a propylene copolymer (R-PP) and
    (ii) an elastomeric propylene copolymer (EC) dispersed in said matrix (M),
    said heterophasic propylene copolymer (RAHECO) has
    (a) a comonomer content in the range of 1.5 to 14.0 mol %;
    (b) a melting temperature determined by differential scanning calorimetry (DSC) in the range of 140 to 155° C.;
    (c) a xylene cold soluble (XCS) fraction determined according to ISO 16152 (25° C.) in the range of 10.0 to equal or below 30.0 wt. %,
    wherein further the propylene copolymer (RAHECO) fulfills
    (d) the in-equation (I):

$$\frac{C\,(XCS)}{C\,(\text{total})} > 2.1 \qquad (I)$$

wherein;

C(XCS) is the comonomer content [in mol %] of the xylene cold soluble (XCS) fraction of the total heterophasic propylene copolymer (RAHECO);

C(total) is the comonomer content [in mol %] of the total heterophasic propylene copolymer (RAHECO); and (e) the in-equation (II):

$$Tm \geq 153.5 - 1.8 C(XCI) \qquad (II)$$

Tm is melting temperature [in ° C.] of the total heterophasic propylene copolymer (RAHECO);

C(XCI) is the comonomer content [in mol %] of the xylene cold insoluble (XCI) fraction of the heterophasic propylene copolymer (RAHECO).

2. Heterophasic propylene copolymer (RAHECO) comprising:
   (i) a matrix (M) being a propylene copolymer (R-PP); and
   (ii) an elastomeric propylene copolymer (EC) dispersed in said matrix (M),
   said heterophasic propylene copolymer (RAHECO) has
   (a) a comonomer content in the range of 1.5 to 14.0 mol %;
   (b) a melting temperature determined by differential scanning calorimetry (DSC) in the range of 140 to 155° C.;
   (c) a xylene cold soluble (XCS) fraction determined according to ISO 16152 (25° C.) in the range of 10.0 to equal or below 30.0 wt. %,
   wherein said propylene copolymer (R-PP) comprises a first polypropylene fraction (PP1) and a second propylene copolymer fraction (R-PP2), the comonomer content in the first polypropylene fraction (PP1) is at most 2.5 mol. %.

3. Heterophasic propylene copolymer (RAHECO) according to claim 2, wherein:
   (a) the comonomer content [in mol %] in the propylene copolymer (R-PP) is higher than in the first polypropylene fraction (PP1); and/or
   (b) the weight ratio between the first polypropylene fraction (PP1) and the second propylene copolymer fraction (R-PP2)[(PP1)/(R-PP2)] is in the range of 10:90 to 60:40.

4. Heterophasic propylene copolymer (RAHECO) according to claim 2, wherein:
   (a) the comonomer content between a first polypropylene fraction (PP1) and the propylene copolymer (R-PP) differ by at least 1.5 mol %; and/or
   (b) the comonomer content between the first polypropylene fraction (PP1) and the second propylene copolymer fraction (R-PP2) differ by at least 3.0 mol%.

5. Heterophasic propylene copolymer (RAHECO) according to claim 2, wherein:
   (a) the first polypropylene fraction (PP1) is a propylene homopolymer; and/or
   (b) the second propylene copolymer fraction (R-PP2) has a comonomer content in the range of 4.0 to 18.0 mol %.

6. Heterophasic propylene copolymer (RAHECO) according claim 2, fulfilling
   (a) the in-equation (I):

$$\frac{C(XCS)}{C(total)} \geq 2.1 \qquad (I)$$

wherein;
C(XCS) is the comonomer content [in mol %] of the xylene cold soluble (XCS) fraction of the total heterophasic propylene copolymer (RAHECO);
C(total) is the comonomer content [in mol %] of the total heterophasic propylene copolymer (RAHECO); and/or (b) the in-equation (II):

$$Tm \geq 152.0 - 1.8 C(XCI) \qquad (II)$$

Tm is melting temperature [in °C.] of the total heterophasic propylene copolymer (RAHECO);
C(XCI) is the comonomer content [in mol %] of the xylene cold insoluble (XCI) fraction of the heterophasic propylene copolymer (RAHECO).

7. Heterophasic propylene copolymer (RAHECO) according to claim 2, wherein:
   (a) the propylene copolymer (R-PP) has a comonomer content in the range of 1.5 to 14.0 mol %; and/or
   (b) the elastomeric propylene copolymer (EC) has a comonomer content in the range of 18.0 to 60.0 mol %.

8. Heterophasic propylene copolymer (RAHECO) according to claim 2, wherein the comonomer in the propylene copolymer (R-PP) and/or the elastomeric propylene copolymer (EC) is ethylene.

9. Heterophasic propylene copolymer (RAHECO) according to claim 2, wherein;
   (a) the xylene cold soluble fraction (XCS) has a comonomer content, e.g. ethylene content, in is in the range of 18.0 to 60.0 mol %; and/or
   (b) the xylene cold in-soluble (XCI) fraction has a comonomer content, e.g. ethylene content, in is in the range of 1.5 to 14.0 mol %.

10. Heterophasic propylene copolymer (RAHECO) according to claim 2, wherein the intrinsic viscosity of the xylene cold soluble fraction (XCS) of the heterophasic propylene copolymer (RAHECO) is in the range of 1.1 to 2.2 dl/g.

11. Heterophasic propylene copolymer (RAHECO) according to claim 2, fulfilling
    (a) in-equation (III):

$$\frac{C(XCS)}{C(XCI)} > 5.0 \qquad (III)$$

wherein;
C(XCS) is the comonomer content [in mol %] of the xylene cold soluble (XCS) fraction of the heterophasic propylene copolymer (RAHECO);
C(XCI) is the comonomer content [in mol %] of the xylene cold insoluble (XCI) fraction of the heterophasic propylene copolymer (RAHECO); and/or (b) in-equation (IV):

$$\frac{C(total)}{XCS} > 0.38 \qquad (IV)$$

Wherein;
C(total) is the comonomer content [in mol-%] of the heterophasic propylene copolymer (RAHECO);
XCS is the content [in wt. %] of the xylene cold soluble (XCS) fraction of the heterophasic propylene copolymer (RAHECO); and/or (c) in-equation (V):

$$\frac{C(XCS)}{XCS} > 1.1 \qquad (V)$$

wherein;
C(XCS) is the comonomer content [in mol %] of the xylene cold soluble (XCS) fraction of the heterophasic propylene copolymer (RAHECO);

XCS is the content [in wt. %] of the xylene cold soluble (XCS) fraction of the heterophasic propylene copolymer (RAHECO).

12. Heterophasic propylene copolymer (RAHECO) according to claim 2, having a first glass transition temperature Tg(1) and a second glass transition temperature Tg(2), wherein said first glass transition temperature Tg(1) is above the second glass transition temperature Tg(2) and second glass transition temperature Tg(2) is at least 40° C.

13. Heterophasic propylene copolymer (RAHECO) according to claim 2, having
    (a) a first glass transition temperature Tg(1) in the range of −12 to +2° C.; and/or
    (b) a second glass transition temperature Tg(2) in the range of −60 to −30° C.; and/or
    (c) the second glass transition temperature Tg(2) fulfills the in-equation (VI)

$$Tg(2) < 11.8 - 1.65 \times C(XCS) \quad (VI)$$

wherein:
    Tg(2) is the second glass transition temperature of the heterophasic propylene copolymer (RAHECO);
    C(XCS) is the comonomer content [in mol %] of the xylene cold soluble fraction (XCS) of the heterophasic propylene copolymer (RAHECO).

14. Heterophasic propylene copolymer (RAHECO) according to claim 2, having:
    (a) a flexural modulus measured according to ISO 178 of at most 550 MPa; and/or
    (b) a hexane extractable content determined according to FDA method on cast films of 100 μm of below 2.4 wt. %.

15. Article comprising the heterophasic propylene copolymer (RAHECO) according to claim 2.

16. Heterophasic propylene copolymer (RAHECO) according to claim 1, wherein:
    (a) the propylene copolymer (R-PP) has a comonomer content in the range of 1.5 to 14.0 mol %; and/or
    (b) the elastomeric propylene copolymer (EC) has a comonomer content in the range of 18.0 to 60.0 mol %.

17. Heterophasic propylene copolymer (RAHECO) according to claim 1, wherein the comonomer in the propylene copolymer (R-PP) and/or the elastomeric propylene copolymer (EC) is ethylene.

18. Heterophasic propylene copolymer (RAHECO) according to claim 1, wherein;
    (c) the xylene cold soluble fraction (XCS) has a comonomer content, e.g., ethylene content, in is in the range of 18.0 to 60.0 mol %; and/or
    (d) the xylene cold in-soluble (XCI) fraction has a comonomer content, e.g. ethylene content, in is in the range of 1.5 to 14.0 mol %.

19. Heterophasic propylene copolymer (RAHECO) according to claim 1, wherein the intrinsic viscosity of the xylene cold soluble fraction (XCS) of the heterophasic propylene copolymer (RAHECO) is in the range of 1.1 to 2.2 dl/g.

20. Heterophasic propylene copolymer (RAHECO) according to claim 1, fulfilling $$\frac{C(XCS)}{C(XCI)} > 5.0 \quad (III)$$

wherein;
C(XCS) is the comonomer content [in mol %] of the xylene cold soluble (XCS) fraction of the heterophasic propylene copolymer (RAHECO);
C(XCI) is the comonomer content [in mol %] of the xylene cold insoluble (XCI) fraction of the heterophasic propylene copolymer (RAHECO); and/or $$\frac{C(total)}{XCS} > 0.38 \quad (IV)$$

wherein;
C(total) is the comonomer content [in mol-%] of the heterophasic propylene copolymer (RAHECO);
XCS is the content [in wt. %] of the xylene cold soluble (XCS) fraction of the heterophasic propylene copolymer (RAHECO); and/or $$\frac{C(XCS)}{XCS} > 1.1 \quad (V)$$

wherein;
C(XCS) is the comonomer content [in mol %] of the xylene cold soluble (XCS) fraction of the heterophasic propylene copolymer (RAHECO);
XCS is the content [in wt. %] of the xylene cold soluble (XCS) fraction of the heterophasic propylene copolymer (RAHECO).

21. Heterophasic propylene copolymer (RAHECO) according to claim 1, having a first glass transition temperature Tg(1) and a second glass transition temperature Tg(2), wherein said first glass transition temperature Tg(1) is above the second glass transition temperature Tg(2) and second glass transition temperature Tg(2) is at least 40° C.

22. Heterophasic propylene copolymer (RAHECO) according to claim 1, having
    (a) a first glass transition temperature Tg(1) in the range of −12 to +2° C.; and/or
    (b) a second glass transition temperature Tg(2) in the range of −60 to −30° C.; and/or
    (c) the second glass transition temperature Tg(2) fulfills the in-equation (VI)

$$Tg(2) < 11.8 - 1.65 \times C(XCS) \quad (VI)$$

wherein:
    Tg(2) is the second glass transition temperature of the heterophasic propylene copolymer (RAHECO);
    C(XCS) is the comonomer content [in mol %] of the xylene cold soluble fraction (XCS) of the heterophasic propylene copolymer (RAHECO).

23. Heterophasic propylene copolymer (RAHECO) according to claim 1, having:
    (a) a flexural modulus measured according to ISO 178 of at most 550 MPa; and/or
    (b) a hexane extractable content determined according to FDA method on cast films of 100 μm of below 2.4 wt. %.

24. Article comprising the heterophasic propylene copolymer (RAHECO) according to claim 1.

* * * * *